United States Patent
Liu et al.

(10) Patent No.: US 10,599,436 B2
(45) Date of Patent: Mar. 24, 2020

(54) DATA PROCESSING METHOD AND APPARATUS, AND SYSTEM

(71) Applicant: HUAWEI TECHNOLOGIES CO., LTD., Shenzhen (CN)

(72) Inventors: Haiyan Liu, Shenzhen (CN); Jun Xu, Hangzhou (CN); Qun Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 92 days.

(21) Appl. No.: 16/006,878

(22) Filed: Jun. 13, 2018

(65) Prior Publication Data

US 2018/0293075 A1 Oct. 11, 2018

Related U.S. Application Data

(63) Continuation of application No. PCT/CN2015/100080, filed on Dec. 31, 2015.

(51) Int. Cl.
*G06F 9/46* (2006.01)
*G06F 9/38* (2018.01)
*G06F 9/50* (2006.01)

(52) U.S. Cl.
CPC .............. *G06F 9/38* (2013.01); *G06F 9/5066* (2013.01); *G06F 2209/5011* (2013.01)

(58) Field of Classification Search
CPC ... G06F 9/38; G06F 9/5066; G06F 2209/5011
See application file for complete search history.

(56) References Cited

U.S. PATENT DOCUMENTS

| 8,756,410 B2 | 6/2014 | Raykova et al. |
| 2009/0216986 A1* | 8/2009 | Sakurai ................. G06F 3/0607 711/170 |
| 2013/0290957 A1 | 10/2013 | Li et al. |

(Continued)

FOREIGN PATENT DOCUMENTS

| CN | 102236581 A | 11/2011 |
| CN | 102456031 A | 5/2012 |

(Continued)

OTHER PUBLICATIONS

Chin-Feng Lai et al: "CPRS: A cloud-based program recommendation system for digital TV platforms", Future Generations Computer Systems, Elsevier Science Publishers. Amsterdam, NL, vol. 27, No. 6, Oct. 12, 2010, pp. 823-835, XP028158733.

*Primary Examiner* — Camquy Truong
(74) *Attorney, Agent, or Firm* — Kilpatrick Townsend & Stockton LLP

(57) ABSTRACT

A data processing method and apparatus are provided. A system includes a CPU pool and a storage pool, a mapper node and a reducer node respectively run on different CPUs in the CPU pool, and a remote storage area shared by the mapper node and the reducer node is delimited in the storage pool. In this method, the mapper node executes a map task, and stores a data segment obtained by executing the map task, into the remote storage area; and the reducer node directly obtains a data segment to be processed by the reducer node from the remote storage area, and executes a reduce task on the data segment. The method omits some actions in the prior art, and shortens a time for executing the Map/Reduce task.

20 Claims, 7 Drawing Sheets

(56) References Cited

U.S. PATENT DOCUMENTS

2014/0358977 A1   12/2014  Cramer et al.
2017/0017569 A1    1/2017  Li et al.
2018/0357111 A1   12/2018  Cai et al.

FOREIGN PATENT DOCUMENTS

| | | |
|---|---|---|
| CN | 102662639 A | 9/2012 |
| CN | 102710772 A | 10/2012 |
| CN | 103279330 A | 9/2013 |
| CN | 103377091 A | 10/2013 |
| CN | 103970520 A | 8/2014 |
| CN | 104317650 A | 1/2015 |
| WO | 2011134875 A1 | 11/2011 |

\* cited by examiner

DATA PROCESSING METHOD AND APPARATUS, AND SYSTEM

CROSS-REFERENCE TO RELATED APPLICATION

This application is a continuation of International Application No. PCT/CN2015/100080, filed on Dec. 31, 2015, the disclosure of which is hereby incorporated by reference in its entirety.

TECHNICAL FIELD this application relate to the computer field, and in particular, to a data processing method and apparatus, and a system.

BACKGROUND

Map/Reduce (Map/Reduce) is a programming model, used for parallel computing of massive datasets, for example, parallel computing of datasets of more than one terabyte (TB).

During dataset processing, a dataset is divided into multiple data slices, and a master (master) node schedules worker (worker) nodes to process the data slices. The master assigns a map task (map task) to an idle worker, and a worker to which the map task has been assigned becomes a mapper node. In addition, the master assigns a reduce task (reduce task) to another idle worker, and a worker to which the reduce task has been assigned becomes a reducer node. The mapper node temporarily stores a result of executing the map task into a circular memory buffer, and spills the result in the circular memory buffer into a disk by using a disk input/output (I/O). One spill file is obtained during each time of spilling. In a process of spilling to generate spill files, the mapper node separately partitions (partition) and sorts (sort) results in the circular memory buffer according to key (key) values processed by all reducer nodes. After completing execution of the map task, the mapper node reads the spill files in the disk, merges (merge) the spill files into one file, and writes the merged file into the disk again. Therefore, in processes of partitioning (partition), sorting (sort), and merging (merge), a disk I/O may be used for multiple times to perform disk read/write operations. The mapper node notifies the master when completing execution of the map task, and then the master notifies the reducer node of an identity of the mapper node. The reducer node requests data from the mapper node according to the identity, the mapper node and the reducer node establish a Transmission Control Protocol (TCP) stream, and the mapper node reads data to be processed by the reducer node from the file stored in the disk, and sends the read data to the reducer node by using the TCP stream. In a process in which the mapper node sends the data to the reducer node by using the TCP stream, the mapper node needs to use a disk I/O to read data from the disk, and use a network I/O to transmit the TCP stream carrying the data to the reducer node. However, performing disk read/write operations by using a disk I/O and transmitting data to the reducer node by using a network I/O are very time-consuming, leading to that an execution time for completing the Map/Reduce task is prolonged.

SUMMARY

In view of this, embodiments of this application provides a data processing method and apparatus, and a system, so as to reduce an execution time of a Map/Reduce task.

According to one aspect, this application provides a data processing method. A system to which the method is applicable includes a storage pool, and a remote storage area is delimited in the storage pool. The method includes: executing, by a mapper node, a map task, and storing a data segment obtained by executing the map task, into the remote storage area; and directly obtaining, by a reducer node, the data segment from the remote storage area, and executing a reduce task on the data segment. The mapper node and the reducer node herein may run on a same central processing unit (CPU), or may run on different CPUs. In addition, the CPU may belong to a non-decoupled computer device, or may belong to a CPU pool.

It may be learned that the method provided in this application omits some actions in the prior art, and shortens a time for executing the Map/Reduce task. The omitted actions include: writing, by the mapper node, an execution result of the map task into a local disk by using a disk I/O; when the reducer node requests the execution result, reading the execution result of the map task from the local disk by using the disk I/O; and sending a TCP stream carrying the execution result to the reducer node by using a network I/O.

In a possible design, the system to which the method is applicable includes the central processing unit CPU pool and the storage pool, the CPU pool is communicatively connected to the storage pool, and specifically, a communicative connection between the CPU pool and the storage pool may be implemented by means of message communication between a controller of the CPU pool and a controller of the storage pool. The CPU pool also has multiple CPUs, and communication between two CPUs in the CPU pool is implemented by using the controller of the CPU pool. A master node, the mapper node, and the reducer node run on different CPUs in the CPU pool.

There are multiple mapper nodes, and herein a first mapper node is used to indicate any one of the multiple mapper nodes. There are also multiple reducer nodes, and herein a first reducer node is used to indicate any one of the multiple reducer nodes. The following describes the method in this application by using the first mapper node and the first reducer node as examples.

The first mapper node executes a map task on a data slice, and obtains N groups of at least one data segment according to an execution result of the map task, where N is a positive integer. Each of the at least one data segment is to be processed by a corresponding reducer node, and different data segments are to be processed by different reducer nodes. A first data segment is a data segment to be processed by the first reducer node in the at least one data segment.

In an optional implementation for obtaining the N groups of at least one data segment, after completing execution of the map task on the data slice, the first mapper node obtains the N groups of at least one data segment according to the execution result of the entire map task. An obtaining manner is not limited herein. For example, the execution result obtained by executing the map task is spilled into the local disk or the storage pool in a form of a spill file; after completing execution of the map task, the first mapper node reads, from the local disk or the storage pool, all spill files spilled by the first mapper node, and generates three data segments (the data segment to be executed by the first reducer node, a data segment to be executed by a second reducer node, and a data segment to be executed by a third reducer node) based on all the read spill files.

In another optional implementation for obtaining the N groups of at least one data segment, duration for which the first mapper node executes the map task on the data slice includes N first time segments, and one group of at least one data segment is obtained according to an execution result of the map task in one first time segment.

Optionally, in an example of the first data segment, if it is expected that the map task is executed before the reduce task is executed, after completing execution of the map task and obtaining the N groups of at least one data segment, the first mapper node stores all first data segments in the N groups of at least one data segment into the remote storage area at the same time, to generate a storage message of each first data segment, and then sends all the storage messages to the master node together. One storage message includes a storage address of the first data segment in the remote storage area and a data volume of the first data segment. The master node sends all the storage messages to the first reducer node.

Each time when receiving one storage message, the first reducer node finds the remote storage area according to the storage address carried in the storage message, uses the storage address carried in the storage message as a start address of the first data segment, and reads data from the start address until all data of the data volume (the data volume carried in the storage message) has been read, thereby completing obtaining the first data segment. By analogy, the first reducer node may read N first data segments.

Alternatively, the first mapper node does not generate one storage message for each of the N first data segments, but stores a storage address of each of all the first data segments and data volum of each of all the first data segments sby using one storage message. In this way, the first mapper node needs to send only one storage message to the master node.

Optionally, in an example of the first data segment, if it is expected that the map task and the reduce task are executed in parallel, in this embodiment, duration for which the first mapper node executes the map task on the data slice includes N first time segments; the first mapper node obtains one group of at least one data segment according to a spill file obtained by executing the map task in one first time segment, and each time when obtaining one group of at least one data segment, stores the first data segment in the group of at least one data segment into the remote storage partition; and the master node instructs the first mapper node to read the first data segment. For example, when an $M^{th}$ first time segment ends, the first mapper node obtains an $M^{th}$ group of at least one data segment according to an execution result obtained by executing the map task in the $M^{th}$ first time segment; and when obtaining the $M^{th}$ group of at least one data segment, the first mapper node stores the $M^{th}$ first data segment into the remote storage area, generates an $M^{th}$ storage message, and sends the $M^{th}$ storage message to the master node.

Each time when reading one first data segment, the first reducer node continues to execute, based on an execution result obtained by executing the reduce task on a previous first data segment, the reduce task on a currently read first data segment until execution of the reduce task is completed on the N first data segments.

In a possible design, a quantity of remote storage areas is greater than or equal to a quantity of the reducer nodes. Each of the at least one reducer node has a corresponding remote storage area. The remote storage area corresponding to the first reducer node is used to store a data segment that is to be processed by the first reducer node and that is in data segments obtained by all the mapper nodes.

In this optional design, regardless of whether the map task is executed before or in parallel with the reduce task, the first mapper node stores the first data segment into the remote storage area corresponding to the first reducer node, and correspondingly, the first reducer node reads the first data segment from the remote storage area corresponding to the first reducer node.

In a possible design, a quantity of remote storage areas is greater than or equal to a quantity of the mapper nodes. Each of the at least one mapper node has a corresponding remote storage area, and a remote storage area corresponding to the first mapper node is used to store the at least one data segment obtained by the first mapper node.

In this optional design, regardless of whether the map task is executed before or in parallel with the reduce task, the first mapper node stores the first data segment into the remote storage area corresponding to the first mapper node, and correspondingly, the first reducer node reads the first data segment from the remote storage area corresponding to the first mapper node.

In a possible design, a quantity of remote storage areas is equal to a product of a quantity of the mapper nodes and a quantity of the reducer nodes, and each remote storage area is shared by one mapper node and one reducer node.

In this optional design, the first mapper node stores the first data segment into the remote storage area shared by the first mapper node and the first reducer node, and correspondingly, the first reducer node reads the first data segment from the remote storage area shared by the first mapper node and the first reducer node.

In a possible design, the storage pool is specifically a memory pool. In comparison with the prior art, a speed of reading/writing data from/into the remote storage area (belonging to the storage pool) by the mapper node and the reducer node is higher than a speed of reading/writing data from/into the local disk, thereby further shortening the time for executing the Map/Reduce task.

According to another aspect, this application provides a computer device, where the computer device includes a processor and a memory, and the processor and the memory are connected by using a bus, where the memory is configured to store a computer instruction, and when the computer device runs, the processor executes the computer instruction stored in the memory, to enable the computer device to perform the foregoing data processing method and the foregoing possible designs.

According to another aspect, this application provides a data processing apparatus, and a system to which the apparatus is applicable is the same as the system to which the foregoing method is applicable. The apparatus is configured to implement a first mapper node, and the apparatus includes a division unit and a sending unit.

The division unit is configured to execute a map task on a data slice, and obtain N groups of at least one data segment according to an execution result of the map task, where N is a positive integer, each of the at least one data segment is to be processed by a corresponding reducer node, the at least one data segment includes a first data segment, the first data segment is a data segment to be processed by the first reducer node, an $M^{th}$ group of at least one data segment includes an $M^{th}$ first data segment, and M is a positive integer less than or equal to N.

The sending unit is configured to: store all first data segments in the N groups of at least one data segment into the remote storage area, generate N storage messages, and send the N storage messages to the master node, where an $M^{th}$ storage message includes a storage address of the $M^{th}$ first data segment in the remote storage area and a data volume of the $M^{th}$ first data segment.

In a possible design, duration for which the first mapper node executes the map task on the data slice includes N first time segments;

that a division unit is configured to execute a map task on a data slice, and obtain N groups of at least one data segment according to an execution result of the map task specifically includes: the division unit is configured to: when an $M^{th}$ first time segment ends, obtain the $M^{th}$ group of at least one data segment according to an execution result obtained by executing the map task in the $M^{th}$ first time segment.

In a possible design, that a sending unit is configured to: store all first data segments in the N groups of at least one data segment into the remote storage area, generate N storage messages, and send the N storage messages to the master node specifically includes:

the sending unit is configured to: when obtaining the $M^{th}$ group of at least one data segment, store the $M^{th}$ first data segment into the remote storage area, generate the $M^{th}$ storage message, and send the $M^{th}$ storage message to the master node.

In a possible design, each of the at least one reducer node has a corresponding remote storage area, and a remote storage area corresponding to the first reducer node is used to store a data segment that is to be processed by the first reducer node and that is in data segments obtained by all mapper nodes;

that the sending unit is configured to store the first data segment into the remote storage area is specifically: the sending unit is configured to store the first data segment into the remote storage area corresponding to the first reducer node.

In a possible design, each of the at least one mapper node has a corresponding remote storage area, and a remote storage area corresponding to the first mapper node is used to store the at least one data segment obtained by the first mapper node;

that the sending unit is configured to store the first data segment into the remote storage area is specifically: that the sending unit is configured to store the first data segment into the remote storage area is specifically: storing, by the first mapper node, the first data segment into the remote storage area corresponding to the first mapper node.

In a possible design, a quantity of remote storage areas is equal to a product of a quantity of mapper nodes and a quantity of reducer nodes, and each remote storage area is shared by one mapper node and one reducer node; that the sending unit is configured to store the first data segment into the remote storage area is specifically: storing, by the first mapper node, the first data segment into the remote storage area shared by the first mapper node and the first reducer node.

In a possible design, the storage pool is a memory pool.

According to another aspect, this application provides a data processing apparatus, and a system to which the apparatus is applicable is the same as the system to which the foregoing method is applicable. The apparatus is configured to implement a first reducer node, and the apparatus includes a receiving unit, an obtaining unit, and an execution unit.

The receiving unit is configured to receive a storage message sent by a master node, where the storage message carries a storage address of a first data segment in the remote storage area and a data volume of the first data segment, and the first data segment is a data segment that is to be processed by the first reducer node and that is in at least one data segment obtained by the first mapper node.

The obtaining unit is configured to obtain the first data segment with the data volume from the remote storage area according to the storage address carried in the storage message.

The execution unit is configured to execute a reduce task on the first data segment.

In a possible design, each of the at least one reducer node has a corresponding remote storage area, and a remote storage area corresponding to the first reducer node is used to store a data segment that is to be processed by the first reducer node and that is in data segments obtained by all mapper nodes;

that an obtaining unit is configured to obtain the first data segment with the data volume from the remote storage area according to the storage address is specifically: the obtaining unit is configured to: determine, according to the storage address, the remote storage area corresponding to the first reducer node, determine a start address of the first data segment in the remote storage area corresponding to the first reducer node, and read the first data segment with the data volume from the start address.

In a possible design, each of the at least one mapper node has a corresponding remote storage area, and a remote storage area corresponding to the first mapper node is used to store the at least one data segment obtained by the first mapper node according to an execution result obtained after the mapper node executes a map task;

that an obtaining unit is configured to obtain the first data segment with the data volume from the remote storage area according to the storage address is specifically: the obtaining unit is configured to: determine, according to the storage address, the remote storage area corresponding to the first mapper node, determine a start address of the first data segment in the remote storage area corresponding to the first mapper node, and read the first data segment with the data volume from the start address.

In a possible design, a quantity of remote storage areas is equal to a product of a quantity of mapper nodes and a quantity of reducer nodes, and each remote storage area is shared by one mapper node and one reducer node;

that an obtaining unit is configured to obtain the first data segment with the data volume from the remote storage area according to the storage address is specifically: the obtaining unit is configured to: determine, according to the storage address, the remote storage area shared by the first mapper node and the first reducer node, determine a start address of the first data segment in the remote storage area shared by the first mapper node and the first reducer node, and read the first data segment with the data volume from the start address.

In a possible design, the storage pool is a memory pool.

According to another aspect, this application provides a system. The system is a system to which both the foregoing method and apparatus are applicable. The system includes a memory pool, the foregoing first mapper node, and the foregoing first reducer node. In comparison with the prior art, the mapper node uses the remote storage area in the storage pool to store the execution result of the map task, and the reducer node may directly read the execution result of the map task from the memory partition, thereby reducing the execution time of the Map/Reduce task.

DESCRIPTION OF EMBODIMENTS

The following clearly describes the technical solutions in the embodiments of this application with reference to the accompanying drawings in the embodiments of this application.

Figure 1:
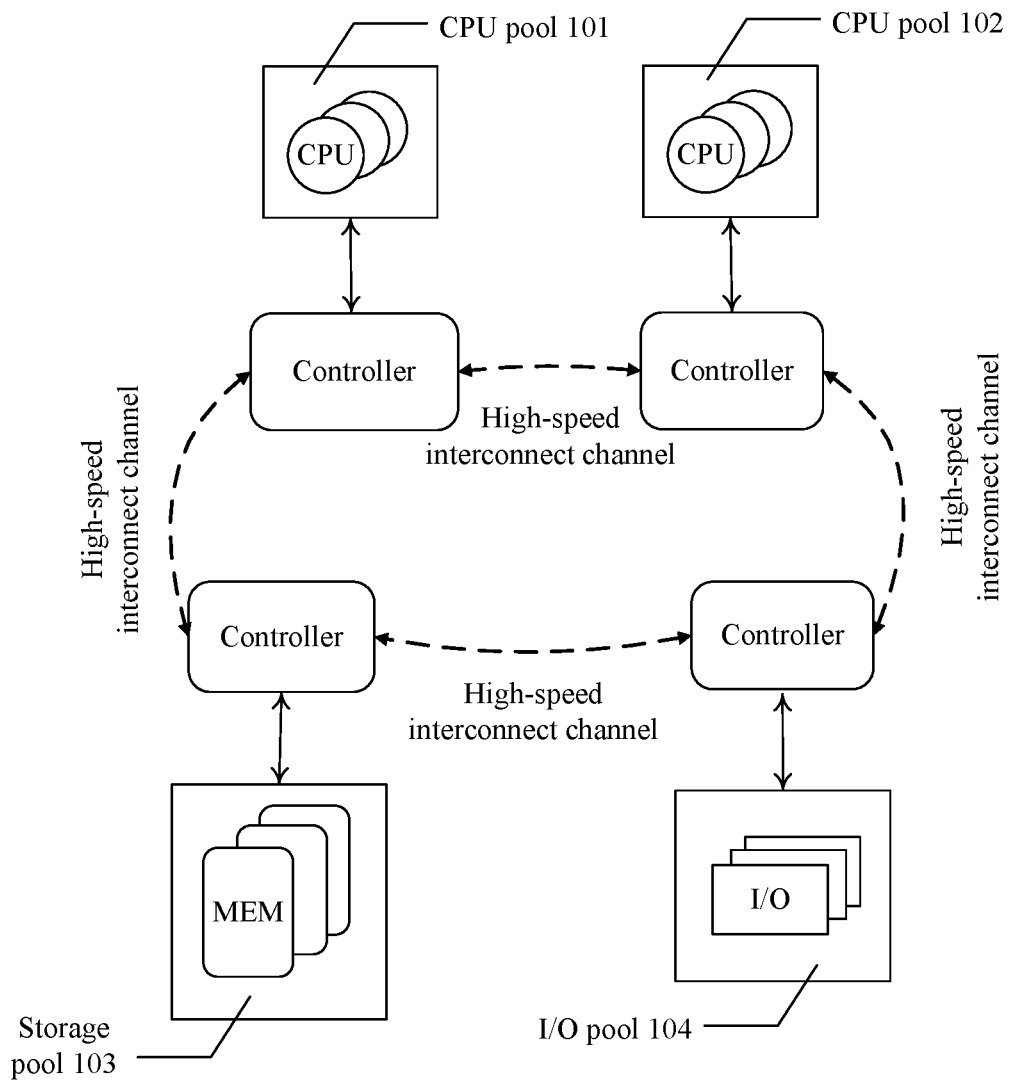
FIG. 1 is a schematic diagram of a system structure in a hardware decoupling scenario.

As shown in FIG. 1, central processing units (CPU), storage media, and input/output (I/O) devices that are included in multiple computer devices are decoupled. Decoupled storage media form one or more storage pools 103 (FIG. 1 shows one storage pool 103), decoupled CPUs form one or more CPU pools (FIG. 1 shows a CPU pool 101 and a CPU pool 102), and decoupled I/O devices form one or more I/O pools 104 (FIG. 1 shows one I/O pool 104).

The storage media include various media capable of storing program code, such as a memory (Mem), a removable hard disk, a read-only memory (ROM), a random access memory (RAM), and a magnetic disk or an optical disc. A computer device may have one or more storage media, and different computer devices may have different storage media. Therefore, the storage pool 103 usually includes more than one type of storage medium.

In some embodiments, to improve data read/write efficiency, the storage pool 103 includes only decoupled memories (Mem), and such a storage pool 103 is actually a memory pool.

A CPU included in the computer device may be a light core (for example, some ARM series processors supporting only a single thread), or may be a many-core of an MIC (Many Integrated Core) architecture, or may be another core having a data processing capability. One computer device may have one or more types of cores, and different computer devices may have different cores. Correspondingly, a CPU pool may have one or more types of CPUs, such as a light core or an MIC.

In some embodiments, a local memory (not shown in FIG. 1) that is not decoupled to the storage pool 103 exists in the computer device. A CPU (generally configured in the same computer device with the local memory) that is in the CPU pool and connected to the local memory can access the local memory, and specifically, access the local memory by using a memory bus. However, a CPU that is in the CPU pool but not connected to the local memory cannot access the local memory.

The computer device may have one or more I/O devices, such as a disk I/O device, a network I/O device, or another I/O device. Correspondingly, the I/O pool 104 may include one or more types of I/O devices.

As shown in FIG. 1, a controller connected to the CPU pool, a controller connected to the storage pool 103, and a controller connected to the I/O pool 104 are communicatively connected by using a high-speed interconnect channel. The high-speed interconnect channel is optionally an optical channel that is set up by using silicon photons. Certainly, the controllers may alternatively be communicatively connected by using another medium or network, which shall not be construed as any limitation to this application herein. When the controllers are communicatively connected, message exchange between components (a CPU in the CPU pool, a memory in the storage pool 103, and an I/O in the I/O pool 104) may be implemented by means of message exchange between the controllers The controller connected to the CPU pool controls allocation of CPU resources, and schedules the CPU resources, so as to cooperate with another CPU, memory, and I/O device, to complete a task assigned by a system. There may be one or more CPU pools. FIG. 1 shows the CPU pool 101 and the CPU pool 102. CPUs in each CPU pool perform message communication by using a shared controller. For CPUs in different CPU pools, mutual message communication (between the CPUs in the different CPU pools) needs to be implemented by means of message communication between the controllers according to their respective message communication capabilities. For example, a specific implementation of message communication between a CPU in the CPU pool 101 and a CPU in the CPU pool 102 is as follows: The CPU in the CPU pool 101 first sends a message to a controller of the CPU pool 101, the controller of the CPU pool 101 forwards the message to a controller of the CPU pool 102, and then the controller of the CPU pool 102 sends the message to the CPU in the CPU pool 102.

The controller connected to the I/O pool 104 controls allocation of I/O resources, and schedules the I/O resources. For example, the CPU in the CPU pool triggers a message carrying an I/O access request, and the message is sent by the controller connected to the CPU pool to the controller connected to the I/O pool 104. The controller connected to the I/O pool 104 allocates an I/O in the I/O pool 104 according to the I/O access request, and accesses an external device by using the allocated I/O. For example, the controller connected to the I/O pool 104 sends an instruction to the external device. For another example, the controller connected to the I/O pool 104 obtains data from the external device. For another example, the controller connected to the I/O pool 104 may allocate an I/O according to a CPU request in the CPU pool, and based on message communication with the controller connected to the storage pool 103, output data stored in the storage pool 103 to the external device by using the allocated I/O, and/or write data that is obtained by using the allocated I/O and that is of the external device into a storage medium of the storage pool 103.

The controller connected to the storage pool 103 is used for management of storage resources, including allocation of the storage resources in the storage pool 103 and setting access permission for the allocated storage resources. In this embodiment, the controller of the storage pool 103 delimits, in the storage pool 103, a remote storage area shared by multiple CPUs (including a CPU on which a mapper node runs and a CPU on which a reducer node runs) in the CPU pool. Optionally, storage addresses of the remote storage area are consecutive, so that a speed of reading/writing a data segment by accessing the remote storage area can be increased. Optionally, the storage address herein may be a physical address. Optionally, the storage address herein may be a logical address. An implementation of accessing the remote storage area by the CPU is as follows: The CPU sends a message carrying an access request to the controller of the CPU pool, and based on message communication between the controller connected to the storage pool 103 and the controller of the CPU pool, the controller of the storage pool 103 receives the message carrying the access request, and accesses the remote storage area designated by the access request. It may be learned that the implementation of accessing the remote storage area by the CPU is different from an implementation of accessing the local memory. The multiple CPUs in the CPU pool can access a same remote storage area. However, the local memory can be accessed only by a local CPU connected to the local memory, and usually, the local CPU directly accesses the local memory by using a memory bus.

The controller of the storage pool 103 may set permission for the multiple CPUs in the CPU pool to access the remote storage area. The access permission that may be set is any one of the following: read only permission, write only permission, read/write permission, or other permission. If the controller of the storage pool 103 sets the read only permission for the remote storage area for a CPU, the CPU can access the remote storage area with the read only permission by using the controller of the storage pool 103, and then read data from the remote storage area. If the controller of the storage pool 103 sets the write only permission for the remote storage area for a CPU, the CPU can access the remote storage area with the write only permission by using the controller of the storage pool 103, and then write data into the remote storage area. If the controller of the storage pool 103 sets the read/write permission for the remote storage area for a CPU, the CPU can access the remote storage area with the read/write permission by using the controller of the storage pool 103, and can not only read data from the remote storage area, but can also write data into the remote storage area.

In this embodiment of this application, the remote storage area delimited in the storage pool 103 is used for executing a Map/Reduce (Map/Reduce) task. The mapper node and the reducer node run on different CPUs in the CPU pool, the mapper node uses the remote storage area to store an execution result of the map task, and the reducer node can directly read the execution result of the map task from the remote storage area, and executes the reduce task on the execution result of the map task, thereby omitting some actions in the prior art, and shortening a time for executing the Map/Reduce task. The omitted actions include: writing, by the mapper node, the execution result of the map task into a local disk by using a disk I/O; when the reducer node requests the execution result, reading the execution result of the map task from the local disk by using the disk I/O; and sending a TCP stream carrying the execution result to the reducer node by using a network I/O. If the storage pool 103 is specifically a memory pool, in comparison with the prior art, a speed of reading/writing data from/into the remote storage area (belonging to the storage pool 103) by the mapper node and the reducer node is higher than a speed of reading/writing data from/into the local disk, thereby further shortening the time for executing the Map/Reduce task.

This embodiment of this application is based on the architecture shown in FIG. 1. To execute the Map/Reduce task in the architecture, the following actions need to be performed first:

A first action: A CPU is determined in the CPU pool, and is used to run a process for implementing a master (master) node. At least two CPUs are determined in the CPU pool, and are used to run a process for implementing multiple worker (worker) nodes.

A second action: The master node assigns a map task to an idle worker node, a worker node executing the map task becomes a mapper node, and the mapper node does not belong to an idle worker node. The master node assigns a reduce task to an idle worker node, a worker node executing the reduce task becomes a reducer node, and the reducer node does not belong to an idle worker node. It may be learned that the mapper node and the reducer node are different nodes.

In a scenario to which this embodiment is applicable, the mapper node and the reducer node run on different CPUs. Multiple mapper nodes may run on one or more CPUs. If the multiple mapper nodes run on a same CPU, the multiple mapper nodes run as threads; or if the multiple mapper nodes respectively run on different CPUs, the multiple mapper nodes run as processes. Similarly, multiple reducer nodes may run on one or more CPUs. If the multiple reducer nodes run on a same CPU, the multiple reducer nodes run as threads; or if the multiple reducer nodes respectively run on different CPUs, the multiple reducer nodes run as processes. Optionally, the master node and the mapper node may run on a same CPU, or the master node and the reducer node may run on a same CPU, or the master node, the mapper node, and the reducer node respectively run on different CPUs.

A third action: The master node applies for a shareable remote storage area from the controller of the storage pool 103 by means of message communication. The controller of the storage pool 103 responds to the application, and delimits the remote storage area. The controller of the storage pool 103 feeds back a storage address included in the remote storage area and permission to access the remote storage area to the master node by means of message communication. The master node then notifies the mapper node of the storage address included in the remote storage area and access permission granted to the mapper node upon the application. The master node then notifies the reducer node of the storage address included in the remote storage area and access permission granted to the reducer node upon the application.

A fourth action: In this embodiment, the Map/Reduce task is executed on a dataset. Before the map task (map task) is executed, the dataset is divided into one or more data slices. Optionally, a specific division rule may be determined according to a task requirement and/or execution efficiency. For example, the dataset is divided into the data slices according to one or more values in a range of 16 MB to 64 MB, which shall not be construed as any limitation to this application herein. In this embodiment, a data slice is used as an input of a mapper node, so that the mapper node executes the map task on the input data slice.

Based on the architecture shown in FIG. 1, Embodiment 1, Embodiment 2, and Embodiment 3 describe a method for executing a Map/Reduce task in the architecture; Embodiment 4 is an extension to Embodiment 1, Embodiment 2, and Embodiment 3, and describes from the perspective of a mapper node a data processing method provided in the architecture; Embodiment 5 is an extension to Embodiment 1, Embodiment 2, and Embodiment 3, and describes from the perspective of a reducer node a data processing method provided in the architecture; Embodiment 6 describes from the perspective of a mapper node a data processing apparatus corresponding to the method provided in Embodiment 4; Embodiment 7 describes from the perspective of a reducer node a data processing apparatus corresponding to the method provided in Embodiment 5; Embodiment 8 describes a computer device that can perform the data processing methods provided in Embodiment 4 and Embodiment 5; and Embodiment 9 describes a system built in the architecture.

Embodiment 1

Figure 2:
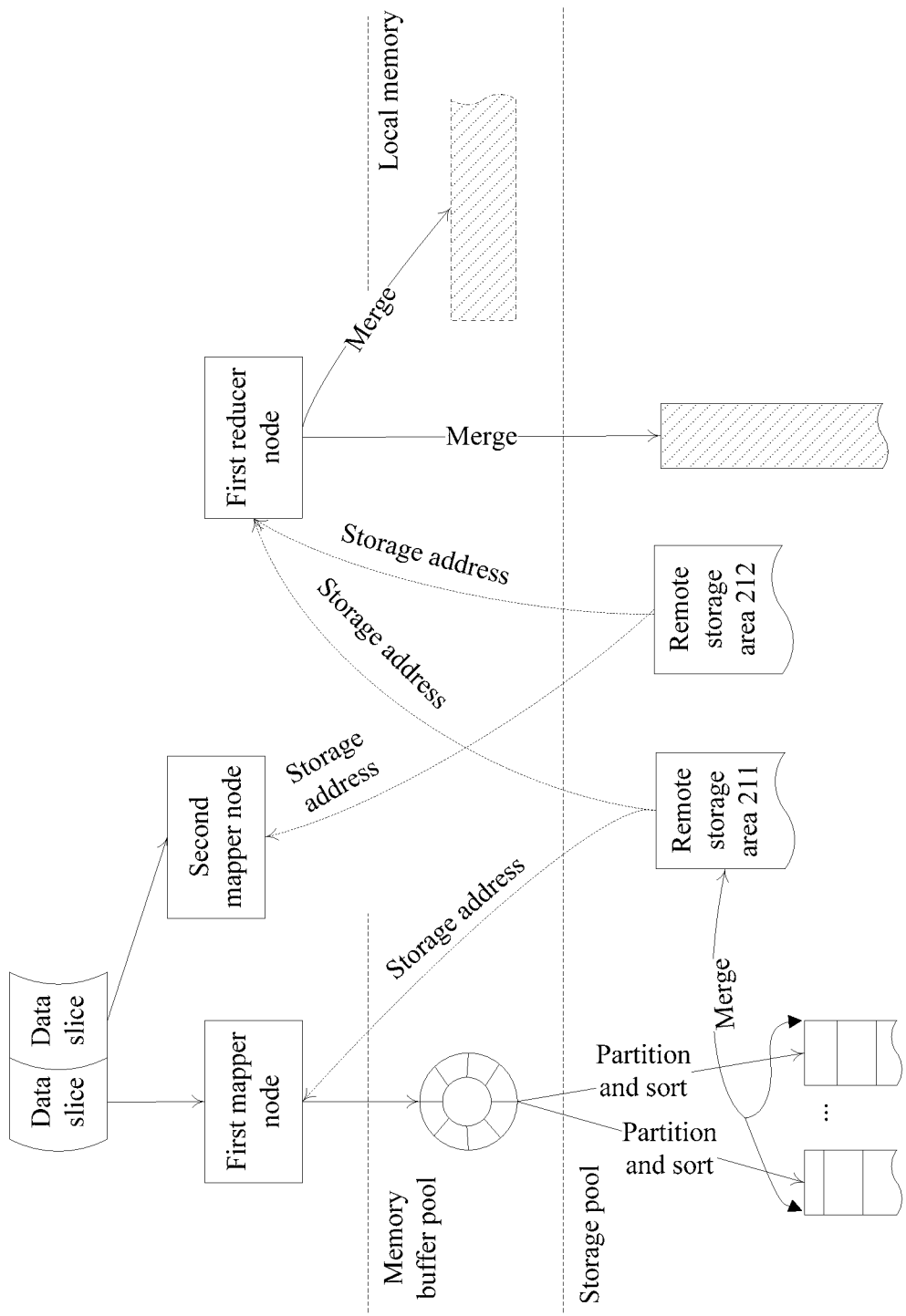
FIG. 2 is an example flowchart of executing a Map/Reduce task.

With reference to FIG. 2, the following describes in detail a specific procedure of executing a Map/Reduce task when a remote storage area is introduced. The procedure includes the following steps: step S201, step S202, step S203, and step S204.

For ease of description, an example in which a dataset is divided into two data slices (referring to FIG. 2) is used in this embodiment to describe the procedure of executing the Map/Reduce task. Therefore, dividing the dataset into two data slices is merely an example, and shall not be construed as any limitation to this embodiment. As shown in FIG. 2, one data slice is to be processed by a first mapper node, and the other data slice is to be processed by a second mapper node. In this embodiment, a master node assigns three reduce tasks, one reduce task is processed by a reducer node, and therefore there are three reducer nodes in total, including a first reducer node, a second reducer node, and a third reducer node. FIG. 2 shows the first reducer node, but does not show the second reducer node and the third reducer node.

It should be noted that after determining the two mapper nodes and the three reducer nodes, the master node notifies the two mapper nodes of identifiers of the three reducer nodes and key (key) values respectively corresponding to the three reducer nodes.

Referring to FIG. 2, the master node applies for two remote storage areas, including a remote storage area 211 and a remote storage area 212, from a controller of a memory pool. Specific rules of allocating, by the master node, the two remote storage areas to the two mapper nodes and the three reducer nodes are as follows:

The remote storage area 211 is shareable to the first mapper node, and read/write permission for the remote storage area 211 is assigned to the first mapper node.

The remote storage area 212 is shareable to the second mapper node, and read/write permission for the remote storage area 212 is assigned to the second mapper node.

The remote storage area 211 is shareable to all the first reducer node, the second reducer node, and the third reducer node, and read permission for the remote storage area 211 is separately assigned to the first reducer node, the second reducer node, and the third reducer node.

The remote storage area 212 is shareable to all the first reducer node, the second reducer node, and the third reducer node, and read permission for the remote storage area 212 is separately assigned to the first reducer node, the second reducer node, and the third reducer node.

Storage addresses of the remote storage area 211 are consecutive. When writing a data segment into the remote storage area 211, the first mapper node writes the data segment into a consecutive storage address in the remote storage area 211. In comparison with writing data into a nonconsecutive storage address, a data writing speed can be increased.

Storage addresses of the remote storage area 212 are also consecutive. When writing a data segment into the remote storage area 212, the second mapper node writes the data segment into a consecutive storage address in the remote storage area 212. In comparison with writing data into a nonconsecutive storage address, a data writing speed can be increased. Optionally, the first mapper node, the first reducer node, the second reducer node, and the third reducer node can read data from the remote storage area 211 at the same time. However, when the first mapper node writes data into some storage addresses in the remote storage area 211, the first reducer node, the second reducer node, and the third reducer node cannot read data from the storage addresses. Similarly, the second mapper node, the first reducer node, the second reducer node, and the third reducer node can read data from the remote storage area 212 at the same time. However, when the second mapper node writes data into some storage addresses in the remote storage area 212, the first reducer node, the second reducer node, and the third reducer node cannot read data from the storage addresses.

The following mainly explains, from the perspectives of the first mapper node and the first reducer node, the specific procedure of executing the Map/Reduce task in this embodiment.

Step S201: The first mapper node executes a map task on an input data slice. In a process of executing the map task, the first mapper node successively writes execution results that are obtained by executing the map task into a circular memory buffer in a memory buffer pool according to a time sequence, and then spills the execution results in the circular memory buffer into a local disk or a storage pool. FIG. 2 shows only a case of spilling the execution results into the storage pool. One spill file is obtained during each time of spilling. A specific spilling process is as follows: An execution result currently expected to be spilled from the circular memory buffer is partitioned (partition) according to a key (key) value corresponding to the reduce task, and three (equal to a quantity of the reducer nodes) data segments are obtained by means of partitioning. Herein, a case in which the execution result obtained each time has a key (key) value corresponding to each reducer node is used as an example. Certainly, if an execution result obtained during a time of spilling does not have a key (key) value corresponding to a reducer node, no data segment corresponding to the reducer node is obtained by means of partitioning, and in this case, a quantity of data segments obtained by means of partitioning is less than three. Then, the three data segments each are sorted (sort) according to the key (key) value, and the three sorted data segments are spilled into the local disk or the storage pool in a form of a file. It may be learned that the spill file obtained during each time of spilling includes three sorted data segments.

Step S202: The first mapper node continuously stores spill files into the local disk or the storage pool in the process of executing the map task. Every other first time segment (a time length of the first time segment is changeable), the first mapper node obtains spill files once from the local disk or the storage pool. Therefore, all spill files in only one first time segment can be obtained from the local disk or the storage pool each time, and all the spill files include spill files respectively spilled at different time points in the first time segment.

It is assumed that duration for which the first mapper node executes the map task on the data slice includes N first time segments. Therefore, the duration for which the first mapper node executes the map task on the data slice includes at least one first time segment. Certainly, longer duration for which the first mapper node executes the map task indicates a larger value of N. In this embodiment, N is a positive integer. M is a positive integer less than or equal to N. The following uses an $M^{th}$ first time segment as an example to describe a case in which the first mapper node obtains spill files once from the local disk or the storage pool: When the $M^{th}$ first time segment ends, the first mapper node obtains spill files once from the local disk or the storage pool, and obtains all the spill files in the $M^{th}$ first time segment from the local disk or the storage pool.

The following uses the $M^{th}$ first time segment as an example to describe a case in which the first mapper node obtains three data segments (data segments to be respectively processed by the three reducer nodes) according to spill files in the $M^{th}$ first time segment. Based on all the spill files in the $M^{th}$ first time segment, the first mapper node obtains, from each spill file, sorted data segments to be respectively processed by the three reducer nodes. Then, the first mapper node sorts (sort) and merges (merge) all sorted data segments with a key (key) value corresponding to a single reducer node, to obtain a data segment to be processed by the single reducer node. By analogy, the first mapper node may separately sort and merge sorted data segments in all the spill files, to obtain data segments to be respectively processed by the three reducer nodes. For example, after obtaining all the spill files in the $M^{th}$ first time segment, the first mapper node separately obtains, according to a key (key) value corresponding to the first reducer node, data segments to be processed by the first reducer node from the three sorted data segments included in each spill file, and then sorts (sort) and merges (merge), according to the key (key) value corresponding to the first reducer node, the data segments obtained from each spill file, to obtain the $M^{th}$ first data segment. The first data segment is a data segment to be processed by the first reducer node.

The first mapper node collects statistics about a data volume of each of the three data segments, for example, collects statistics about a data volume of the first data segment.

The first mapper node stores all the three data segments into the remote storage area 211, and records a storage address of each of the three data segments in the remote storage area 211, for example, records a storage address of the first data segment in the remote storage area 211.

After storing the three data segments into the remote storage area 211, the first mapper node generates a first storage message. The first storage message includes one address array and a data volume of each data segment, and the storage addresses of the three data segments are respectively recorded into three address variables of the address array. Optionally, a one-to-one mapping relationship between the three address variables of the address array and identifiers of the three reducer nodes (including the first reducer node, the second reducer node, and the third reducer node) is predetermined. Based on a one-to-one mapping relationship between key (key) values of the three data segments and the identifiers of the three reducer nodes, a one-to-one mapping relationship between the three address variables and the three data segments may be determined. The first mapper node respectively records, based on the one-to-one mapping relationship between the three address variables and the three data segments, the storage addresses of the three data segments into the three address variables of the address array.

The first mapper node sends the first storage message to the master node.

In this embodiment, in the process in which the first mapper node executes the map task, the first mapper node generates one group of three data segments (including the first data segment to be processed by the first reducer node, a data segment to be processed by the second reducer node, and a data segment to be processed by the third reducer node) every other first time segment. Because the duration for which the first mapper node executes the map task on the data slice includes N first time segments, the first mapper node generates N groups of three data segments (including the first data segment to be processed by the first reducer node, the data segment to be processed by the second reducer node, and the data segment to be processed by the third reducer node) according to a time sequence. According to the time sequence, each time when generating one group of three data segments, the first mapper node generates one first storage message corresponding to the group of three data segments, and sends the first storage message corresponding to the group of three data segments to the master node. It may be learned that if N is equal to 1, that is, the first time segment is the duration for which the first mapper node executes the map task on the data slice, the first reducer node generates only one group of three data segments, and correspondingly generates only one first storage message, and sends the first storage message to the master node; or if N is greater than 1, that is, the duration for which the first mapper node executes the map task on the data slice includes multiple first time segments, the first reducer node successively generates multiple groups of three data segments according to the time sequence, and when generating each group of three data segments, correspondingly generates a first storage message corresponding to the group of three data segments, and sends the first storage message corresponding to the group of three data segments to the master node.

Step S203: The master node has predetermined a one-to-one mapping relationship between three address variables of an address array and identifiers of the three reducer nodes (including the first reducer node, the second reducer node, and the third reducer node).

Each time when receiving the first storage message sent by the first mapper node, the master node separately generates, according to the address array in the first storage message and the foregoing predetermined one-to-one mapping relationship (the one-to-one mapping relationship between the three address variables of the address array and the identifiers of the three reducer nodes), a second storage message to be sent to the first reducer node, a second storage message to be sent to the second reducer node, and a second storage message to be sent to the third reducer node, and sends the corresponding second storage messages to the three reducer nodes (including the first reducer node, the second reducer node, and the third reducer node) respectively. Optionally, the first reducer node proactively sends a query request to the master node every other specific time, and when receiving the first storage message sent by the first mapper node, the master node responds to the latest query request, and sends the second storage message (including the storage address of the first data segment and the data volume of the first data segment) corresponding to the first reducer node to the first reducer node. Similarly, the second reducer node and the third reducer node may obtain the second storage messages respectively corresponding to the second reducer node and the third reducer node from the master node in time.

The second storage message sent to the first reducer node includes: the storage address of the first data segment in the remote storage area 211 and the data volume of the first data segment. Similarly, the second storage message sent to the second reducer node includes: a storage address of the data segment to be processed by the second reducer node in the remote storage area 211 and a data volume of the data segment to be processed by the second reducer node. Similarly, the second storage message sent to the third reducer node includes: a storage address of the data segment to be processed by the third reducer node in the remote storage area 211 and a data volume of the data segment to be processed by the third reducer node.

Step S204: Each time when receiving a second storage message sent to the first reducer node by the master node, the first reducer node finds the remote storage area 211 according to a storage address of a first data segment carried in the second storage message, uses the storage address carried in the second storage message as a start address of the first data segment in the remote storage area 211, reads the first data segment from the start address, and then reads, according to a data volume of the first data segment carried in the second storage message, the complete first data segment from the remote storage area 211, that is, reads the first data segment with the data volume from the remote storage area 211. Similarly, the second reducer node receives the second storage message sent to the second reducer node by the master node, and reads, according to the second storage message, the data segment to be processed by the second reducer node from the remote storage area 211. Similarly, the third reducer node receives the second storage message sent to the third reducer node by the master node, and reads, according to the second storage message, the data segment to be processed by the third reducer node from the remote storage area 211.

Similarly, in a process of executing a map task, the second mapper node generates three data segments every other second time segment, including a data segment to be processed by the first reducer node, a data segment to be processed by the second reducer node, and a data segment to be processed by the third reducer node; and the second mapper node writes the three data segments into the remote storage area 212, and determines respective storage addresses of the three data segments and respective data volumes of the three data segments. Similar to the first mapper node, by means of notification of the master node, the first reducer node, the second reducer node and the third reducer node may learn the storage addresses of the respective to-be-processed data segments in the remote storage area 212 and the data volumes of the data segments from the second mapper node. Then, the first reducer node may read, from the remote storage area 212 according to a storage address and a data volume that are notified by the master node to the first reducer node, the complete data segment to be processed by the first reducer node; the second reducer node may read, from the remote storage area 212 according to a storage address and a data volume that are notified by the master node to the second reducer node, the complete data segment to be processed by the second reducer node; and the third reducer node may read, from the remote storage area 212 according to a storage address and a data volume that are notified by the master node to the third reducer node, the complete data segment to be processed by the third reducer node.

The first reducer node executes the reduce task on the first data segment read from the remote storage area 211 and the data segment read from the remote storage area 212. The first reducer node may merge (merge) execution results obtained by executing the reduce task and then write a merged execution result into a local storage medium (for example, the disk), or may merge (merge) obtained execution results and then write a merged execution result into the storage pool, or certainly may merge (merge) obtained execution results and then write a merged execution result into another storage medium. This is not limited herein.

Similarly, after the second reducer node respectively reads data segments to be processed by the second reducer node from the remote storage area 211 and the remote storage area 212, the second reducer node executes the reduce task on the read data segments. The second reducer node may merge (merge) execution results obtained by executing the reduce task and then write a merged execution result into a storage medium (such as the local disk or the storage pool).

Similarly, after the third reducer node respectively reads data segments to be processed by the third reducer node from the remote storage area 211 and the remote storage area 212, the third reducer node executes the reduce task on the read data segments. The third reducer node may merge (merge) execution results obtained by executing the reduce task and then write a merged execution result into a storage medium (such as the local disk or the storage pool).

In this embodiment, the first mapper node stores a file including the first data segment into the remote storage area 211, and the first reducer node can directly obtain, from the remote storage area, the first data segment to be processed by the reducer node. In this way, the steps in the prior art that when the first reducer node requests the first data segment from the first mapper node, first reading, by the first mapper node, the first data segment from the local disk, and then sending the read first data segment to the first reducer node by using a TCP stream are omitted. In this embodiment, all the mapper nodes and reducer nodes work similarly, and a time required for executing the Map/Reduce task is effectively shortened. If the remote storage area is delimited in a memory pool, in comparison with the prior art, a speed of reading/writing data by accessing the remote storage area by the mapper node and the reducer node is higher than a speed of reading/writing data from/into the local disk, thereby further shortening the time for executing the Map/Reduce task.

In the process of executing the map task, the first mapper node generates one group of three data segments (a first data segment to be processed by the first reducer node, a data segment to be processed by the second reducer node, and a data segment to be processed by the third reducer node) every other first time segment, and stores currently generated first data segments into some storage addresses in the remote storage area 211. The first reducer node reads a current group of first data segments from the remote storage area 211, and executes the reduce task on the read first data segments. At the same time, the first mapper node continues to execute the map task, and generates a next group of first data segments, and the first mapper node stores the next group of first data segments into some other storage addresses in the remote storage area 211. In this way, the map task executed by the first mapper node is in parallel with the reduce task executed by the first reducer node. The second mapper node works similarly as the first mapper node. The second reducer node and the third reducer node work similarly as the first reducer node. In this way, map tasks executed by the two mapper nodes (the first mapper node and the second mapper node) can be in parallel with reduce tasks executed by the three reducer nodes (the first reducer node, the second reducer node, and the third reducer node). In comparison with the prior art in which the map task is executed before the reduce task, the time for executing the Map/Reduce task can be reduced.

In addition, a principle in which the mapper nodes and the reducer nodes work in parallel is described from the perspective of the remote storage area as follows: The first mapper node, the first reducer node, the second reducer node, and the third reducer node can access the remote storage area 211 at the same time; and when the first mapper node writes a current group of data segments into some storage addresses in the remote storage area 211, the first reducer node, the second reducer node, and the third reducer node can simultaneously read, from some other storage addresses in the remote storage area 211, a previous group of data segments to be respectively processed by the first reducer node, the second reducer node, and the third reducer node. For example, when the first mapper node writes a current group of first data segments into some storage addresses in the remote storage area 211, the first reducer node can simultaneously read a previous group of first data segments from some other storage addresses in the remote storage area 211. In this way, the map task executed by the first mapper node is in parallel with the reduce tasks executed by the three reducer nodes (the first reducer node, the second reducer node, and the third reducer node). Similarly, the second mapper node, the first reducer node, the second reducer node, and the third reducer node can access the remote storage area 212 at the same time; and when the second mapper node writes a current group of data segments into some storage addresses in the remote storage area 212, the first reducer node, the second reducer node, and the third reducer node can simultaneously read, from some other storage addresses in the remote storage area 212, a previous group of data segments to be respectively processed by the first reducer node, the second reducer node, and the third reducer node. In this way, the map task executed by the second mapper node is in parallel with the reduce tasks executed by the three reducer nodes (the first reducer node, the second reducer node, and the third reducer node). Based on the above, when the first mapper node and the second mapper node execute respective map tasks and write the data segments into respective remote storage areas (the remote storage area 211 and the remote storage area 212), the three reducer nodes (the first reducer node, the second reducer node, and the third reducer node) simultaneously read, from the two remote storage areas (the remote storage area 211 and the remote storage area 212), the data segments to be processed by the three reducer nodes, and the three reducer nodes execute respective reduce tasks on the data segments respectively read by the three reducer nodes, so that the map tasks executed by the mapper nodes (the first mapper node and the second mapper node) are in parallel with the reduce tasks executed by the reducer nodes (the first reducer node, the second reducer node, and the third reducer node).

In this embodiment, the storage addresses of the remote storage area 211 are consecutive. In this way, when writing the data segments into the remote storage area 211, the first mapper node writes the data segments into the consecutive storage addresses of the remote storage area 211. Similarly, the storage addresses of the remote storage area 212 are consecutive. In this way, when writing the data segments into the remote storage area 212, the second mapper node writes the data segments into the consecutive storage addresses of the remote storage area 212. In comparison with the mapper nodes, the three reducer nodes need to separately read, from the two remote storage areas (the remote storage area 211 and the remote storage area 212), the data segments to be processed by the three reducer nodes. Therefore, the reducer nodes do not read, from consecutive storage addresses, all the data segments to be processed by the reducer nodes. In comparison with a speed at which the mapper nodes write the data segments into the remote storage areas, a speed at which the reducer nodes read the data segments is lower. Therefore, this embodiment is applicable to a scenario in which load of the map task is heavier than load of the reduce task, and is further applicable to a scenario in which a quantity of the mapper nodes is greater than a quantity of the reducer nodes.

Embodiment 2

Figure 3:
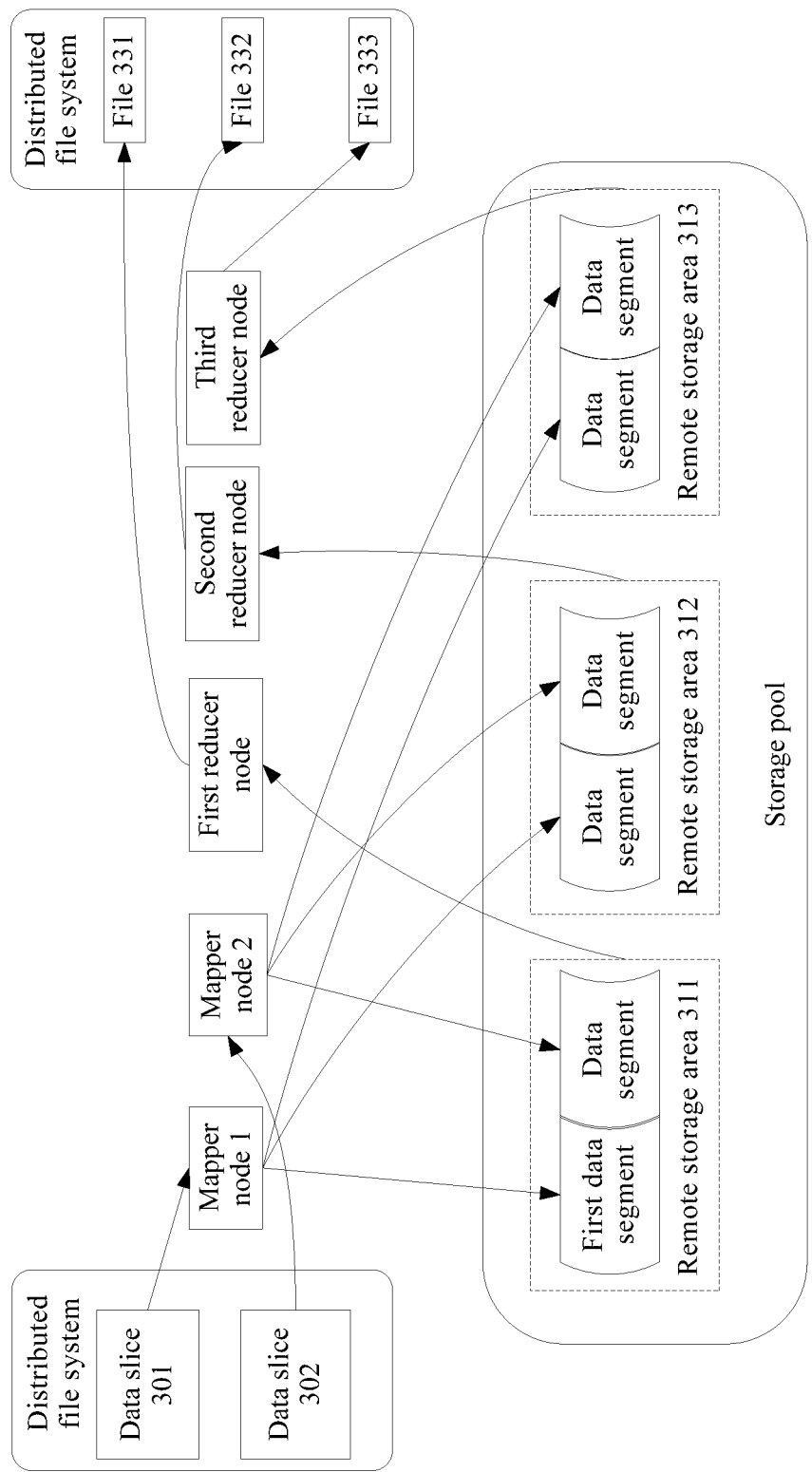
FIG. 3 is an example flowchart of executing a Map/Reduce task.

In this embodiment, datasets are stored and managed by using a Hadoop distributed file system (HDFS). Therefore, in this embodiment, a dataset is divided into two data slices. FIG. 3 shows a data slice 301 and a data slice 302, which are also stored in the HDFS. It should be noted that, dividing the dataset into two data slices is merely an example, and the dataset may be divided into one or more data slices. Therefore, a quantity of the data slices shall not be construed as a limitation to this embodiment.

A master node (not shown in FIG. 3) determines two mapper nodes in idle worker nodes. FIG. 3 shows a first mapper node and a second mapper node. The first mapper node executes a map task on the data slice 301, and the second mapper node executes a map task on the data slice 302. In addition, the master node determines three reducer nodes in the idle worker nodes. FIG. 3 shows a first reducer node, a second reducer node, and a third reducer node. After determining the two mapper nodes and the three reducer nodes, the master node notifies the two mapper nodes of identifiers of the three reducer nodes and key (key) values respectively corresponding to the three reducer nodes.

A difference from Embodiment 1 is as follows: In Embodiment 1, a remote storage area is allocated to help a mapper node to write a data segment. Specifically, storage addresses of the remote storage area are consecutive; the mapper node writes data segments to be processed by reducer nodes into the consecutive storage addresses of the remote storage area, but the reducer nodes need to read the data segments to be processed by the reducer nodes from different remote storage areas. However, in Embodiment 2, a remote storage area is allocated for convenience of a reducer node. Specifically, storage addresses of the remote storage area are consecutive; a mapper node needs to write data segments to be processed by reducer nodes into remote storage areas corresponding to the reducer nodes, and correspondingly, a reducer node can read, from one remote storage area, all data segments to be processed by the reducer node. For example, storage addresses of a remote storage area 311 that is allocated to the first reducer node by a controller of a storage pool are consecutive, the first mapper node writes data segments to be processed by the first reducer node into some storage addresses in the remote storage area 311, and the second mapper node also writes data segments to be processed by the first reducer node into some other storage addresses in the remote storage area 311, and therefore the first reducer node can directly read, from the remote storage area 311, all the data segments to be processed by the first reducer node.

Referring to FIG. 3, in Embodiment 2, the remote storage area 311 is shared by the first reducer node and the two mapper nodes (the first mapper node and the second mapper node); a remote storage area 312 is shared by the second reducer node and the two mapper nodes (the first mapper node and the second mapper node); and a remote storage area 313 is shared by the third reducer node, and the first mapper node and the second mapper node.

Implementation of a procedure of executing a Map/Reduce task in Embodiment 2 is similar to implementation of the procedure of executing the Map/Reduce task in Embodiment 1. For example, the following steps are all similar implementations: the step of executing the map task by the mapper node, the step of spilling, by the mapper node, to obtain one spill file every other first time segment, the step of obtaining, by the mapper node, a data segment by means of merging according to spill files in a time interval, the step of learning, by the master node, a storage address and a data volume of the data segment from the mapper node, and the step of executing the reduce task by the reducer node. These similar implementation steps are not repeatedly described herein, and similar implementation parts are not repeatedly described herein.

In comparison with the procedure of executing the Map/Reduce task in Embodiment 1, the procedure of executing the Map/Reduce task in Embodiment 2 has the following three differences.

A first difference: The master node notifies, in advance, the first mapper node of some storage addresses that can be accessed by the first mapper node in the remote storage area 311, some storage addresses that can be accessed by the first mapper node in the remote storage area 312, and some storage addresses that can be accessed by the first mapper node in the remote storage area 313. After obtaining, by means of merging (merge) based on spill files (all spill files in a current first time segment), a first data segment to be processed by the first reducer node, a data segment to be processed by the second reducer node, and a data segment to be processed by the third reducer node, the first mapper node writes the first data segment into the storage addresses that can be accessed by the first mapper node in the remote storage area 311, writes the data segment to be processed by the second reducer node into the storage addresses that can be accessed by the first mapper node in the remote storage area 312, and writes the data segment to be processed by the third reducer node into the storage addresses that can be accessed by the first mapper node in the remote storage area 313.

Similarly, the master node notifies, in advance, the second mapper node of some storage addresses that can be accessed by the second mapper node in the remote storage area 311, some storage addresses that can be accessed by the second mapper node in the remote storage area 312, and some storage addresses that can be accessed by the second mapper node in the remote storage area 313. After obtaining, by means of merging (merge) based on spill files (all spill files in a current first time segment), a first data segment to be processed by the first reducer node, a data segment to be processed by the second reducer node, and a data segment to be processed by the third reducer node, the second mapper node writes the first data segment into the storage addresses that can be accessed by the second mapper node in the remote storage area 311, writes the data segment to be processed by the second reducer node into the storage addresses that can be accessed by the second mapper node in the remote storage area 312, and writes the data segment to be processed by the third reducer node into the storage addresses that can be accessed by the second mapper node in the remote storage area 313.

A second difference: The first reducer node directly reads, from the remote storage area 311, all data segments to be processed by the first reducer node, without accessing another remote storage area throughout an entire reading process, thereby improving data reading efficiency of the first reducer node.

Similarly, the second reducer node directly reads, from the remote storage area 312, all data segments to be processed by the second reducer node, without accessing another remote storage area throughout an entire reading process, thereby improving data reading efficiency of the second reducer node.

Similarly, the third reducer node directly reads, from the remote storage area 313, all data segments to be processed by the third reducer node, without accessing another remote storage area throughout an entire reading process, thereby improving data reading efficiency of the third reducer node.

A third difference: An execution result obtained by executing the reduce task by the reducer node can be stored in the HDFS. An execution result obtained by executing the reduce task on the data segment by the first reducer node is stored in the HDFS in a form of a file 331. An execution result obtained by executing the reduce task on the data segment by the second reducer node is stored in the HDFS in a form of a file 332. An execution result obtained by executing the reduce task on the data segment by the third reducer node is stored in the HDFS in a form of a file 333.

A similar effect between Embodiment 2 and Embodiment 1 is as follows: The steps in the prior art that when the reducer node requests the data segment from the mapper node, first reading, by the mapper node, the data segment from a local disk, and then sending the read data segment to the reducer node by using a TCP stream are omitted, and thereby effectively shortening a time required for executing the Map/Reduce task.

A beneficial effect of Embodiment 2 different from that of Embodiment 1 is as follows: In Embodiment 2, the remote storage area is allocated for convenience of the reducer node, and the storage addresses of the remote storage area are consecutive. All the mapper nodes store data segments to be processed by a same reducer node into a same remote storage area, and the same reducer node can read, from the same remote storage area, all the data segments to be processed by the same reducer node, thereby increasing a speed of reading all the data segments to be processed by the same reducer node. In comparison with the reducer nodes, both the two mapper nodes need to write the data segments to be processed by the first reducer node into the remote storage area 311, write the data segments to be processed by the second reducer node into the remote storage area 312, and write the data segments to be processed by the third reducer node into the remote storage area 313. Therefore, in comparison with a case in which the mapper nodes do not write all the data segments into a single remote storage area, the first reducer node can read all the data segments to be processed by the first reducer node from the remote storage area 311, the second reducer node can read all the data segments to be processed by the second reducer node from the remote storage area 312, and the third reducer node can read all the data segments to be processed by the third reducer node from the remote storage area 313. A speed at which the reducer nodes read the data segments is relatively high. Therefore, this embodiment is applicable to a scenario in which load of the reduce task is heavier than load of the map task, and is further applicable to a scenario in which a quantity of the reducer nodes is greater than a quantity of the mapper nodes.

Embodiment 3

Figure 4:
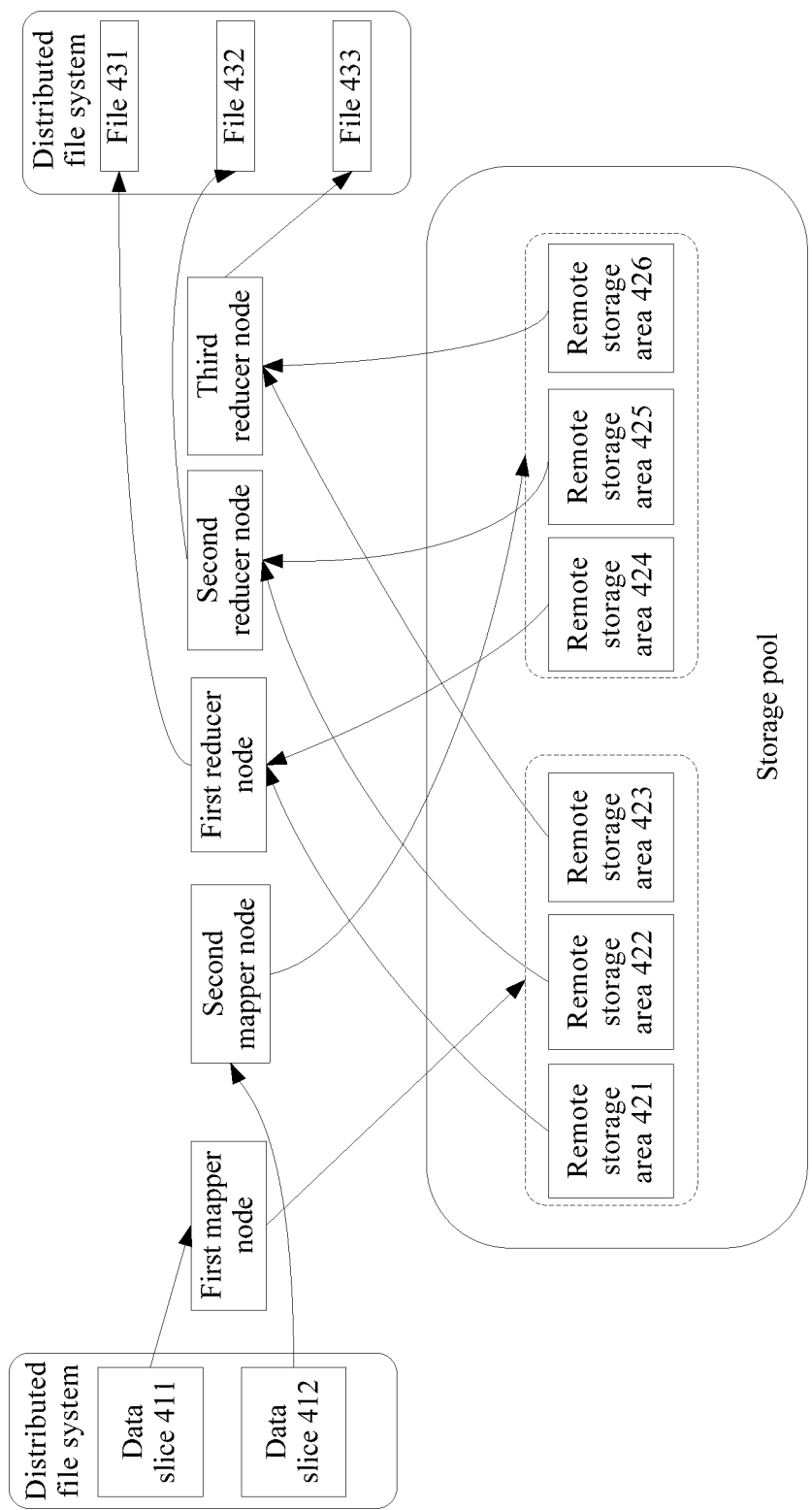
FIG. 4 is an example flowchart of executing a Map/Reduce task.

In this embodiment, datasets are stored and managed by using a Hadoop distributed file system (Hadoop Distributed File System, HDFS for short). Therefore, in this embodiment, a dataset is divided into two data slices. FIG. 4 shows a data slice 401 and a data slice 402, which are also stored in the HDFS. It should be noted that, dividing the dataset into two data slices is merely an example, and the dataset may be divided into one or more data slices. Therefore, a quantity of the data slices shall not be construed as a limitation to this embodiment.

A master node (not shown in FIG. 4) determines two mapper nodes in idle worker nodes. FIG. 4 shows a first mapper node and a second mapper node. The first mapper node executes a map task on the data slice 401, and the second mapper node executes a map task on the data slice 402. In addition, the master node determines three reducer nodes in the idle worker nodes. FIG. 4 shows a first reducer node, a second reducer node, and a third reducer node. After determining the two mapper nodes and the three reducer nodes, the master node notifies the two mapper nodes of identifiers of the three reducer nodes and key (key) values respectively corresponding to the three reducer nodes.

A difference from Embodiment 1 is as follows: In Embodiment 1, a remote storage area is allocated to help a mapper node to write a data segment. Specifically, storage addresses of the remote storage area are consecutive; the mapper node writes data segments to be processed by reducer nodes into the consecutive storage addresses of the remote storage area, but the reducer nodes need to read the data segments to be processed by the reducer nodes from different remote storage areas. However, in Embodiment 3, a remote storage area is allocated considering both load of a mapper node and load of a reducer node. Storage addresses of the remote storage area are consecutive; all data segments that are to be processed by a same reducer node and that are generated by a mapper node each time are stored in a same remote storage area. For example, all first data segments that are to be processed by the first reducer node and that are generated by the first mapper node each time are stored into a remote storage area 421, and the first reducer node reads the first data segments from consecutive storage addresses of the remote storage area 421. Similarly, one mapper node and one reducer node share one remote storage area, and the remote storage area is used to store a data segment that is to be processed by the reducer node and that is generated by the mapper node. In this way, both a writing speed at which the mapper nodes write the data segments into the remote storage areas and a reading speed at which the reducer nodes read the data segments from the remote storage areas are taken into consideration.

Referring to FIG. 4, in Embodiment 3, the remote storage area 421 is shared by the first mapper node and the first reducer node; a remote storage area 422 is shared by the first mapper node and the second reducer node; a remote storage area 423 is shared by the first mapper node and the third reducer node; a remote storage area 424 is shared by the second mapper node and the first reducer node; a remote storage area 425 is shared by the second mapper node and the second reducer node; and a remote storage area 426 is shared by the second mapper node and the third reducer node.

A specific procedure of executing a Map/Reduce task in Embodiment 3 is similar to the procedure of executing the Map/Reduce task in Embodiment 1 in all the following steps: the step of executing the map task by the mapper node, the step of spilling, by the mapper node, to obtain one spill file every other first time segment, the step of obtaining, by the mapper node, a data segment by means of merging according to spill files in a time interval, the step of learning, by the master node, a storage address and a data volume of the data segment from the mapper node, and the step of executing the reduce task by the reducer node. These similar implementation steps are not repeatedly described herein.

In comparison with the procedure of executing the Map/Reduce task in Embodiment 1, the specific procedure of executing the Map/Reduce task in Embodiment 3 has the following three differences.

A first difference: The first mapper node stores all the first data segments to be processed by the first reducer node into the remote storage area 411. Similarly, the first mapper node stores data segments to be processed by the second reducer node into a remote storage area 412, and stores data segments to be processed by the third reducer node into a remote storage area 413. Similarly, the second mapper node stores data segments to be processed by the first reducer node into a remote storage area 414, stores data segments to be processed by the second reducer node into a remote storage area 415, and stores data segments to be processed by the third reducer node into a remote storage area 416.

A second difference: The first reducer node learns a second storage message (carrying a storage address of a first data segment and a data volume of the first data segment) from the master node, determines the remote storage area 411 according to the storage address carried in the second storage message, and reads the first data segment with the data volume (the data volume carried in the second storage message) from consecutive storage addresses starting from the storage address in the remote storage area 411. Similarly, the first reducer node reads the data segments to be processed by the first reducer node from the remote storage area 414.

Similar to a case in which the first reducer node reads the data segments to be processed by the first reducer node, the second reducer node reads the data segments to be processed by the second reducer node from the remote storage area 412 and the remote storage area 415; and the third reducer node reads the data segments to be processed by the third reducer node from the remote storage area 413 and the remote storage area 416.

A third difference: An execution result obtained by executing the reduce task by the reducer node can be stored in the HDFS. Specifically, an execution result obtained by executing the reduce task on the data segments by the first reducer node is stored in the HDFS in a form of a file 431, an execution result obtained by executing the reduce task on the data segments by the second reducer node is stored in the HDFS in a form of a file 432, and an execution result obtained by executing the reduce task on the data segments by the third reducer node is stored in the HDFS in a form of a file 433.

A similar effect between Embodiment 3 and Embodiment 1 is as follows: The steps in the prior art that when the reducer node requests the data segment from the mapper node, first reading, by the mapper node, the data segment from a local disk, and then sending the read data segment to the reducer node by using a TCP stream are omitted, and thereby effectively shortening a time required for executing the Map/Reduce task.

A beneficial effect of Embodiment 3 different from that of Embodiment 1 is as follows: One data segment is stored in one remote storage area, the mapper nodes need to write data segments into multiple remote storage areas, and the reducer nodes also need to read the data segments from the multiple remote storage area. In this way, both a writing speed at which the mapper nodes write the data segments into the remote storage areas and a reading speed at which the reducer nodes read the data segments from the remote storage areas are taken into consideration. Therefore, this embodiment is applicable to a scenario in which load of the reduce task is equivalent to load of the map task, and is further applicable to a scenario in which a quantity of the reducer nodes is basically equal to a quantity of the mapper nodes.

In some embodiments, the map task executed by the mapper node is in parallel with the reduce task executed by the reducer node. Assuming that storage space of the remote storage area requested by the master node from the controller of the storage pool is limited, if an execution speed of the map task is higher than an execution speed of the reduce task, memory usage of the remote storage area may reach a preset value in the parallel execution process of the map task and the reduce task, indicating that the storage space of the remote storage area is almost used up. To keep the map task and the reduce task in parallel, the master node requests a spare storage area from the controller of the storage pool when the memory usage of the remote storage area reaches the preset value. When the memory usage of the remote storage area may reach the preset value, the mapper node suspends writing a data segment into the remote storage area, but writes a data segment obtained by further executing the map task into the spare storage area. The reducer node continues to read the stored data segments from the remote storage area, and does not read the data segment from the spare storage area until all the data segments stored in the remote storage area are read, and based on a result of the reduce task that has been executed (a result obtained by executing the reduce task on the data segments read from the remote storage area), continues to execute the reduce task on the data segment read from the spare storage area. It may be learned that in this optional solution, when the execution speed of the map task is higher than the execution speed of the reduce task, to implement parallel execution of the map task and the reduce task, the spare storage area is additionally requested when a specific condition is met, thereby ensuring parallel execution of the map task and the reduce task.

Embodiment 4

As a corresponding extension to the foregoing three embodiments, Embodiment 4 provides a basic working procedure of a data processing method from the perspective of a mapper node. For a system architecture of a system to which the basic working procedure is applicable, refer to the system architecture shown in FIG. 1, and for a detailed description of the system architecture, refer to the foregoing corresponding description of the system architecture shown in FIG. 1. The system includes a CPU pool and a storage pool, and the CPU pool is communicatively connected to the storage pool.

The CPU pool includes at least two CPUs, and a master node, at least one mapper node, and at least one reducer node run in the CPU pool. It may be learned that there being two mapper nodes in Embodiment 1, Embodiment 2, and Embodiment 3 is merely an example, and there being three reducer nodes in Embodiment 1, Embodiment 2, and Embodiment 3 is also merely an example. The at least one mapper node includes a first mapper node, and the first mapper node is any mapper node in the at least one mapper node. The at least one reducer node includes a first reducer node, and the first reducer node is any reducer node in the at least one reducer node. The first mapper node and the first reducer node run on different CPUs in the CPU pool, and message communication between the first mapper node and the first reducer node is implemented by forwarding a message (for example, a data request message) by a controller of the CPU pool. Optionally, the master node, the mapper nodes, and the reducer nodes respectively run on different CPUs in different CPU pools. Optionally, the master node and the mapper nodes run on a same CPU in the CPU pool, but oppositely, the master node and the reducer nodes run on different CPUs in the CPU pool. Optionally, the master node and the reducer nodes run on a same CPU in the CPU pool, but oppositely, the master node and the mapper nodes run on different CPUs in the CPU pool.

A remote storage area included in the storage pool is shared by the first mapper node and the first reducer node, and optionally, the storage pool is a memory pool. Specifically, the master node applies for the remote storage area and access permission for the remote storage area for the first mapper node and the first reducer node from a controller of the storage pool, and allocates the remote storage area to the first mapper node and the first reducer node. For an allocation implementation, refer to the related descriptions of allocation of the remote storage area in Embodiment 1, Embodiment 2, and Embodiment 3. The remote storage area herein may be shareable to all mapper nodes in the at least one mapper node and all reducer nodes in the at least one reducer node, or certainly may be shareable to only to the first mapper node and the first reducer node, but is shareable at least to the first mapper node and the first reducer node. In this embodiment, both the first mapper node and the first reducer node access the remote storage area in a mounting manner.

Figure 5:
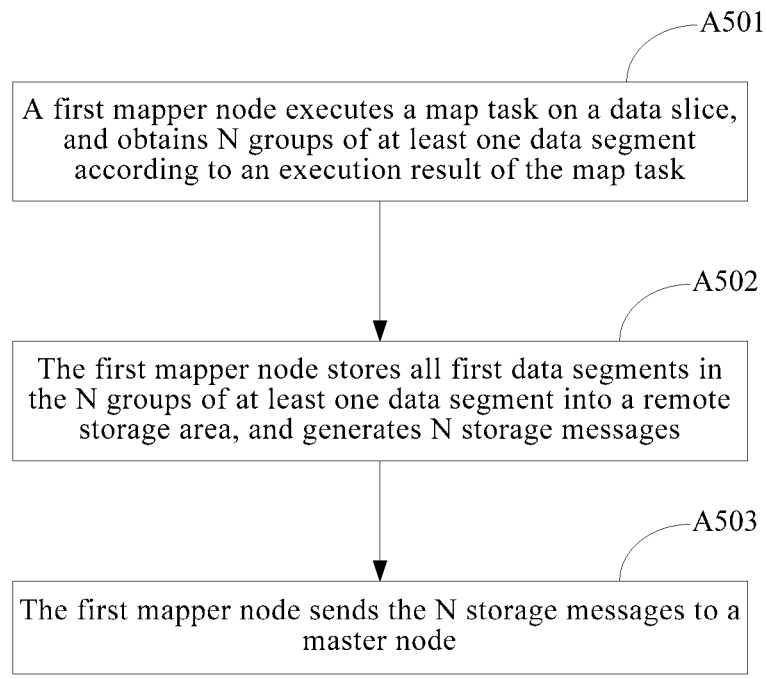
FIG. 5 is a basic flowchart of a data processing method described from the perspective of a mapper node.

The basic working procedure shown in FIG. 5 is provided from the perspective of the first mapper node, and the basic working procedure provided in FIG. 5 includes: step A501, step A502, and step A503.

First, a dataset is divided into one or more data slices. For a specific division manner, refer to the foregoing related description of the fourth action (which is the fourth action of executing a Map/Reduce task in this architecture). The data slices may be different or may be the same in size. One data slice is used as an input of one mapper node, and one mapper node executes a map task on one data slice.

Step A501: The first mapper node executes a map task on a data slice, and obtains N groups of at least one data segment according to an execution result of the map task, where N is a positive integer, each of the at least one data segment is to be processed by a corresponding reducer node, the at least one data segment includes a first data segment, the first data segment is a data segment to be processed by the first reducer node, an $M^{th}$ group of at least one data segment includes an $M^{th}$ first data segment, and M is a positive integer less than or equal to N.

Step A501 of obtaining the N groups of at least one data segment according to the execution result of the map task has at least two implementations:

In a first implementation, after completing execution of the map task on the data slice, the first mapper node obtains the N groups of at least one data segment according to the execution result of the entire map task. An obtaining manner is not limited herein. For example, the execution result obtained by executing the map task is spilled into a local disk or the storage pool in a form of a spill file; after completing execution of the map task, the first mapper node reads, from the local disk or the storage pool, all spill files spilled by the first mapper node, and generates three data segments (the data segment to be executed by the first reducer node, a data segment to be executed by a second reducer node, and a data segment to be executed by a third reducer node) based on all the read spill files.

In a second implementation, duration for which the first mapper node executes the map task on the data slice includes N first time segments. It may be learned that longer duration for which the first mapper node executes the map task indicates a larger value of N, and it may be learned that N is a positive integer greater than or equal to 1.

In the following example in which the first mapper node executes the map task in an $M^{th}$ first time segment, the executing, by the first mapper node, a map task on a data slice, and obtaining N groups of at least one data segment according to an execution result of the map task specifically includes: when the $M^{th}$ first time segment ends, obtaining, by the first mapper node, the $M^{th}$ group of at least one data segment according to an execution result obtained by executing the map task in the $M^{th}$ first time segment.

For details of implementation of obtaining, by the first mapper node, one group of at least one data segment according to the execution result obtained by executing the map task in the $M^{th}$ first time segment, refer to the corresponding description in Embodiment 1. It may be learned that the first mapper node generates one group of at least one data segment during each first time segment.

Step A502: The first mapper node stores all first data segments in the N groups of at least one data segment into the remote storage area, and generates N storage messages, where an $M^{th}$ storage message includes a storage address of the $M^{th}$ first data segment in the remote storage area and a data volume of the $M^{th}$ first data segment.

Step A503: The first mapper node sends the N storage messages to the master node.

Specifically, if the first implementation is used to implement step A501, N in both step A502 and step A503 is equal to 1.

If the second implementation is used to implement step A501, that is, N is greater than or equal to 1, there are two optional manners of performing step A502 and step A503.

In a first optional manner of performing step A502 and step A503, if it is expected that the map task is executed before the reduce task, in step A502, all first data segments in the N groups of at least one data segment may be stored into the remote storage area at the same time, to generate N storage messages; and then in step A503, the N storage messages are sent to the master node together.

In a second optional manner of performing step A502 and step A503, if it is expected that the map task and the reduce task are executed in parallel, each time when one group of at least one data segment corresponding to one first time segment is obtained in step A501, a first data segment included in the group of at least one data segment is stored into the remote storage area, to generate one storage message in step A502; and then in step A503, the storage message is sent to the master node, the master node forwards the storage message to the first reducer node, and the reducer node reads the first data segment included in the group of at least one data segment from the remote storage area according to the storage message. For implementation details of this optional manner, refer to the corresponding description of performing related steps by the first mapper node in Embodiment 1, Embodiment 2, and Embodiment 3.

An example is used to describe implementation details of the second optional manner of performing step A502 and step A503 as follows: storing, by the first mapper node when obtaining the $M^{th}$ group of at least one data segment, the $M^{th}$ first data segment into the remote storage area, generating the $M^{th}$ storage message, and sending the $M^{th}$ storage message to the master node.

For implementation details of the storing, by the first mapper node when obtaining the $M^{th}$ group of at least one data segment, the $M^{th}$ first data segment into the remote storage area, generating the $M^{th}$ storage message, and sending the $M^{th}$ storage message to the master node, refer to the corresponding description in Embodiment 1. It may be learned that each time when generating one group of at least one data segment, the first mapper node stores one first data segment into the remote storage area, generates a storage message corresponding to the data segment, and sends the storage message to the master node, so that the first reducer node reads the first data segment from the remote storage area according to the storage message in time; and each time when reading one first data segment, the first reducer node continues to execute, based on an execution result obtained by executing the reduce task on a previous first data segment, the reduce task on a currently read first data segment until execution of the reduce task is completed on the N first data segments.

In some embodiments, a quantity of remote storage areas is greater than or equal to a quantity of the reducer nodes. Each of the at least one reducer node has a corresponding remote storage area. The remote storage area corresponding to the first reducer node is used to store a data segment that is to be processed by the first reducer node and that is in data segments obtained by all the mapper nodes.

It should be noted that regardless of whether the map task is executed before or in parallel with the reduce task, the storing, by the first mapper node, the first data segment into the remote storage area is specifically: storing, by the first mapper node, the first data segment into the remote storage area corresponding to the first reducer node. For implementation details of the storing, by the first mapper node, the first data segment into the remote storage area corresponding to the first reducer node, refer to the corresponding description of the storing, by the first mapper node, the first data segment into the remote storage area 211 in Embodiment 1.

In some embodiments, a quantity of remote storage areas is greater than or equal to a quantity of the mapper nodes. Each of the at least one mapper node has a corresponding remote storage area, and a remote storage area corresponding to the first mapper node is used to store the at least one data segment obtained by the first mapper node.

It should be noted that regardless of whether the map task is executed before or in parallel with the reduce task, the storing, by the first mapper node, the first data segment into the remote storage area is specifically: storing, by the first mapper node, the first data segment into the remote storage area corresponding to the first mapper node.

For implementation details of the storing, by the first mapper node, the first data segment into the remote storage area corresponding to the first mapper node, refer to the corresponding description of the storing, by the first mapper node, the first data segment into the remote storage area 311 in Embodiment 2.

In some embodiments, a quantity of remote storage areas is equal to a product of a quantity of the mapper nodes and a quantity of the reducer nodes, and each remote storage area is shared by one mapper node and one reducer node.

It should be noted that regardless of whether the map task is executed before or in parallel with the reduce task, the storing, by the first mapper node, the first data segment into the remote storage area is specifically: storing, by the first mapper node, the first data segment into the remote storage area shared by the first mapper node and the first reducer node.

For implementation details of the storing, by the first mapper node, the first data segment into the remote storage area shared by the first mapper node and the first reducer node, refer to the corresponding description of the storing, by the first mapper node, the first data segment into the remote storage area 421 in Embodiment 3.

Embodiment 5

As a corresponding extension to the foregoing Embodiment 1, Embodiment 2, and Embodiment 3, Embodiment 5 provides a basic working procedure of a data processing method from the perspective of a reducer node. A system to which the basic working procedure is applicable is the same as the system to which the basic working procedure of the data processing method provided from the perspective of the mapper node in Embodiment 4 is applicable, and details are not repeatedly described herein.

Figure 6:
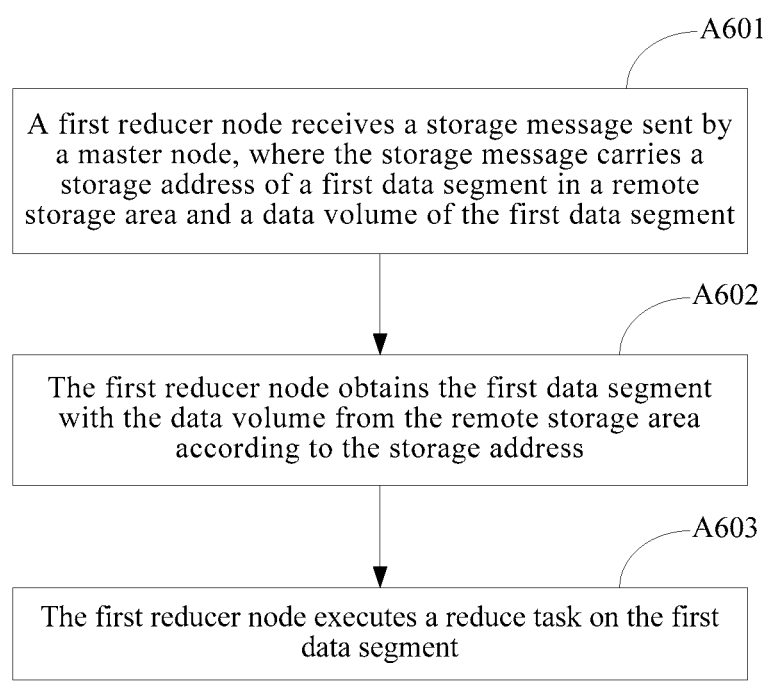
FIG. 6 is a basic flowchart of a data processing method described from the perspective of a reducer node.

The basic working procedure shown in FIG. 6 is provided from the perspective of a first reducer node, and the basic working procedure provided in FIG. 6 includes: step A601, step A602, and step A603.

Step A601: The first reducer node receives a storage message sent by a master node, where the storage message carries a storage address of a first data segment in a remote storage area and a data volume of the first data segment, and the first data segment is a data segment that is to be processed by the first reducer node and that is in at least one data segment obtained by a first mapper node.

Step A602: The first reducer node obtains the first data segment with the data volume from the remote storage area according to the storage address carried in the storage message.

Step A603: The first reducer node executes a reduce task on the first data segment.

For implementation details of performing step A601, step A602, and step A603 by the first reducer node, refer to the corresponding descriptions of performing related steps by the first reducer node in Embodiment 1, Embodiment 2, Embodiment 3, and Embodiment 4.

Optionally, a quantity of remote storage areas is greater than or equal to a quantity of reducer nodes. Optionally, each reducer node in at least one reducer node has a corresponding remote storage area, and a remote storage area corresponding to the first reducer node is used to store a data segment that is to be processed by the first reducer node and that is in data segments obtained by all mapper nodes.

That the first reducer node obtains the first data segment with the data volume from the remote storage area according to the storage address is specifically: the first reducer node determines, according to the storage address, the remote storage area corresponding to the first reducer node, determines a start address of the first data segment in the remote storage area corresponding to the first reducer node, and reads the first data segment with the data volume from the start address.

In this embodiment, the storage address carried in the storage message is determined as the start address of the first data segment in the remote storage area corresponding to the first reducer node, and data with the data volume (the data volume carried in the storage message) is read from the start address, thereby reading the complete first data segment. In this embodiment, for a specific reading process in which the first mapper node reads the first data segment, refer to the detailed description of reading, by the first mapper node, the first data segment from the remote storage area 211 in Embodiment 1.

In some embodiments, a quantity of remote storage areas is greater than or equal to a quantity of mapper nodes. Each of the at least one mapper node has a corresponding remote storage area, and a remote storage area corresponding to the first mapper node is used to store the at least one data segment obtained by the first mapper node according to an execution result obtained after the mapper node executes a map task.

That the first reducer node obtains the first data segment with the data volume from the remote storage area according to the storage address is specifically: the first reducer node determines, according to the storage address, the remote storage area corresponding to the first mapper node, determines a start address of the first data segment in the remote storage area corresponding to the first mapper node, and reads the first data segment with the data volume from the start address.

In this embodiment, the storage address carried in the storage message is determined as the start address of the first data segment in the remote storage area corresponding to the first mapper node, and data with the data volume (the data volume carried in the storage message) is read from the start address, thereby reading the complete first data segment. In this embodiment, for a specific reading process in which the first mapper node reads the first data segment, refer to the detailed description of reading, by the first mapper node, the first data segment from the remote storage area 311 in Embodiment 2.

In some embodiments, a quantity of remote storage areas is equal to a product of a quantity of mapper nodes and a quantity of reducer nodes, and each remote storage area is shared by one mapper node and one reducer node.

That the first reducer node obtains the first data segment with the data volume from the remote storage area according to the storage address is specifically: the first reducer node determines, according to the storage address, the remote storage area shared by the first mapper node and the first reducer node, determines a start address of the first data segment in the remote storage area shared by the first mapper node and the first reducer node, and reads the first data segment with the data volume from the start address.

In this embodiment, the storage address carried in the storage message is determined as the start address of the first data segment in the remote storage area shared by the first mapper node and the first reducer node, and the first mapper node reads data with the data volume (the data volume carried in the storage message) from the start address, thereby reading the complete first data segment. In this embodiment, for a specific reading process in which the first mapper node reads the first data segment, refer to the detailed description of reading, by the first mapper node, the first data segment from the remote storage area 421 in Embodiment 2.

In some embodiments, the storage pool is a memory pool.

Embodiment 6

A data processing apparatus provided in Embodiment 6 includes apparatus units capable of implementing the method procedure provided in Embodiment 4. For brevity, no specific description is made herein to actions performed by functional units provided in Embodiment 6, and reference may be directly made to the corresponding action descriptions provided in the method procedures provided in Embodiment 1, Embodiment 2, Embodiment 3, and Embodiment 4.

Figure 7:
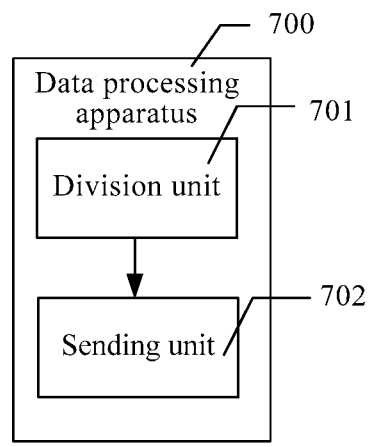
FIG. 7 is a schematic diagram of a logical structure of a data processing apparatus 700 that can be used as a mapper node.

Referring to FIG. 7, a system to which the data processing apparatus 700 provided in this embodiment is applicable includes a central processing unit CPU pool and a storage pool, and the CPU pool is communicatively connected to the storage pool. The CPU pool includes at least two CPUs, a master node, at least one mapper node, and at least one reducer node run in the CPU pool, the at least one mapper node includes a first mapper node, the at least one reducer node includes a first reducer node, and the first mapper node and the first reducer node run on different CPUs in the CPU pool. A remote storage area included in the storage pool is shared by the first mapper node and the first reducer node. The data processing apparatus 700 is used as the first mapper node, and the apparatus includes:

a division unit 701, configured to execute a map task on a data slice, and obtain N groups of at least one data segment according to an execution result of the map task, where N is a positive integer, each of the at least one data segment is to be processed by a corresponding reducer node, the at least one data segment includes a first data segment, the first data segment is a data segment to be processed by the first reducer node, an $M^{th}$ group of at least one data segment includes an $M^{th}$ first data segment, and M is a positive integer less than or equal to N; and a sending unit 702, configured to: store all first data segments in the N groups of at least one data segment into the remote storage area, generate N storage messages, and send the N storage messages to the master node, where an $M^{th}$ storage message includes a storage address of the $M^{th}$ first data segment in the remote storage area and a data volume of the $M^{th}$ first data segment.

In some embodiments, duration for which the first mapper node executes the map task on the data slice includes N first time segments.

That a division unit 701 is configured to execute a map task on a data slice, and obtain N groups of at least one data segment according to an execution result of the map task specifically includes: the division unit is configured to: when an $M^{th}$ first time segment ends, obtain the $M^{th}$ group of at least one data segment according to an execution result obtained by executing the map task in the $M^{th}$ first time segment.

Optionally, that a sending unit 702 is configured to: store all first data segments in the N groups of at least one data segment into the remote storage area, generate N storage messages, and send the N storage messages to the master node specifically includes:

the sending unit 702 is configured to: when obtaining the $M^{th}$ group of at least one data segment, store the $M^{th}$ first data segment into the remote storage area, generate the $M^{th}$ storage message, and send the $M^{th}$ storage message to the master node.

Optionally, each of the at least one reducer node has a corresponding remote storage area, and a remote storage area corresponding to the first reducer node is used to store a data segment that is to be processed by the first reducer node and that is in data segments obtained by all mapper nodes.

That the sending unit 702 is configured to store the first data segment into the remote storage area is specifically: the sending unit 702 is configured to store the first data segment into the remote storage area corresponding to the first reducer node.

In some embodiments, each of the at least one mapper node has a corresponding remote storage area, and a remote storage area corresponding to the first mapper node is used to store the at least one data segment obtained by the first mapper node.

That the sending unit 702 is configured to store the first data segment into the remote storage area is specifically: that the sending unit 702 is configured to store the first data segment into the remote storage area is specifically: storing, by the first mapper node, the first data segment into the remote storage area corresponding to the first mapper node.

In some embodiments, a quantity of remote storage areas is equal to a product of a quantity of mapper nodes and a quantity of reducer nodes, and each remote storage area is shared by one mapper node and one reducer node.

That the sending unit 702 is configured to store the first data segment into the remote storage area is specifically: that the sending unit 702 is configured to store the first data segment into the remote storage area is specifically: storing, by the first mapper node, the first data segment into the remote storage area shared by the first mapper node and the first reducer node.

In some embodiments, the storage pool is a memory pool.

Embodiment 7

A data processing apparatus provided in Embodiment 7 includes apparatus units capable of implementing the method procedure provided in Embodiment 5. For brevity, no specific description is made herein to actions performed by functional units provided in Embodiment 7, and reference may be directly made to the corresponding action descriptions provided in the method procedures provided in Embodiment 1, Embodiment 2, Embodiment 3, Embodiment 4, and Embodiment 5.

Figure 8:
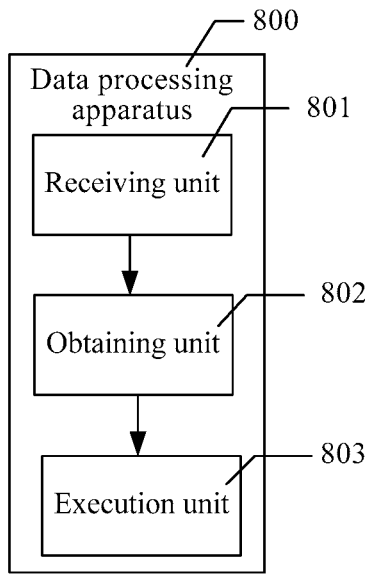
FIG. 8 is a schematic diagram of a logical structure of a data processing apparatus 800 that can be used as a reducer node.

Referring to FIG. 8, a system to which the data processing apparatus 800 provided in this embodiment is applicable includes a central processing unit CPU pool and a storage pool, and the CPU pool is communicatively connected to the storage pool. The CPU pool includes at least two CPUs, a master node, at least one mapper node, and at least one reducer node run in the CPU pool, the at least one mapper node includes a first mapper node, the at least one reducer node includes a first reducer node, and the first mapper node and the first reducer node run on different CPUs in the CPU pool. A remote storage area included in the storage pool is shared by the first mapper node and the first reducer node. The data processing apparatus 800 is used as the first reducer node, and the apparatus includes:

a receiving unit 801, configured to receive a storage message sent by the master node, where the storage message carries a storage address of a first data segment in the remote storage area and a data volume of the first data segment, and the first data segment is a data segment that is to be processed by the first reducer node and that is in at least one data segment obtained by the first mapper node;

an obtaining unit 802, configured to obtain the first data segment with the data volume from the remote storage area according to the storage address carried in the storage message; and an execution unit 803, configured to execute a reduce task on the first data segment.

In some embodiments, each of the at least one reducer node has a corresponding remote storage area, and a remote storage area corresponding to the first reducer node is used to store a data segment that is to be processed by the first reducer node and that is in data segments obtained by all mapper nodes.

That an obtaining unit 802 is configured to obtain the first data segment with the data volume from the remote storage area according to the storage address is specifically: the obtaining unit 802 is configured to: determine, according to the storage address, the remote storage area corresponding to the first reducer node, determine a start address of the first data segment in the remote storage area corresponding to the first reducer node, and read the first data segment with the data volume from the start address.

In some embodiments, each of the at least one mapper node has a corresponding remote storage area, and a remote storage area corresponding to the first mapper node is used to store the at least one data segment obtained by the first mapper node according to an execution result obtained after the mapper node executes a map task.

That an obtaining unit 802 is configured to obtain the first data segment with the data volume from the remote storage area according to the storage address is specifically: the obtaining unit 802 is configured to: determine, according to the storage address, the remote storage area corresponding to the first mapper node, determine a start address of the first data segment in the remote storage area corresponding to the first mapper node, and read the first data segment with the data volume from the start address.

In some embodiments, a quantity of remote storage areas is equal to a product of a quantity of mapper nodes and a quantity of reducer nodes, and each remote storage area is shared by one mapper node and one reducer node.

That an obtaining unit 802 is configured to obtain the first data segment with the data volume from the remote storage area according to the storage address is specifically: the obtaining unit 802 is configured to: determine, according to the storage address, the remote storage area shared by the first mapper node and the first reducer node, determine a start address of the first data segment in the remote storage area shared by the first mapper node and the first reducer node, and read the first data segment with the data volume from the start address.

In some embodiments, the storage pool is a memory pool.

Embodiment 8

Figure 9:
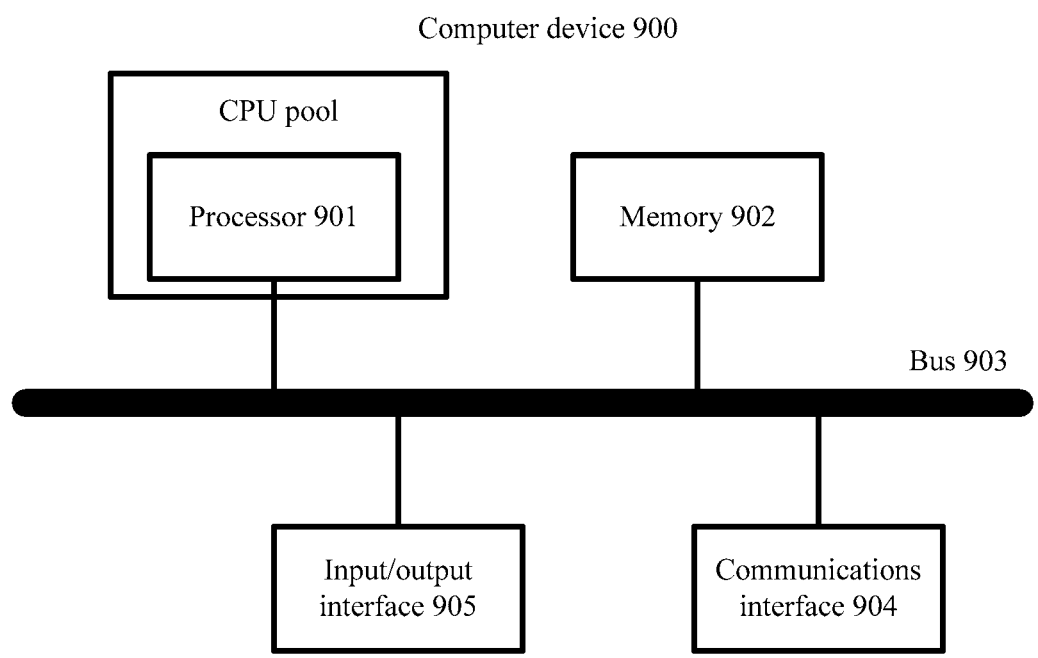
FIG. 9 is a schematic diagram of a hardware architecture of a computer device 900.

Embodiment 8 provides a hardware device for performing steps in the method provided in Embodiment 4 and/or Embodiment 5. Referring to FIG. 9, the hardware device is a computer device 900. The computer device 900 shown in FIG. 9 is the foregoing decoupled computer device in this embodiment of this application, and the computer device 900 includes a processor 901 and a memory 902, where the processor 901 and the memory 902 are connected by using a bus 903.

The memory 902 is configured to store a computer instruction, and when the computer device 900 runs, the processor 901 executes the computer instruction stored in the memory 902, to enable the computer device 900 to perform the data processing method provided in Embodiment 4 and/or Embodiment 5. For specific implementations of the steps in the data processing method, refer to the corresponding descriptions of the steps in Embodiment 1, Embodiment 2, Embodiment 3, and Embodiment 4. Details are not repeatedly described herein.

The processor 901 may be a general-purpose central processing unit (CPU), a microprocessor, an application-specific integrated circuit (ASIC), or one or more integrated circuits, and is used to execute related programs to implement the technical solutions provided in the foregoing method embodiments. Certainly, the processor 901 may be a CPU in a CPU pool.

The memory 902 may be a read-only memory (ROM), a static storage device, a dynamic storage device, or a random access memory (RAM). The memory 902 stores program code for implementing the technical solutions provided in the foregoing method embodiments, and may further store an operating system program. When the technical solutions provided in the foregoing method embodiments are implemented by software or firmware, the program code is executed by the processor 901. The memory 902 may be a storage medium in a storage pool, or may be a local storage medium, for example, a local disk.

The bus 903 may include a channel, to transmit information between components (for example, the processor 901, the memory 902, an input/output interface 905, and a communications interface 904).

The input/output interface 905 is configured to receive data such as input data and information and an output operation result.

The communications interface 904 uses a transceiver apparatus such as but not limited to a transceiver, to implement network communication between the processor 901 and another device or communications network. Optionally, the communications interface 904 may be any of various interfaces for accessing a network, for example, an Ethernet interface for accessing Ethernet. The Ethernet interface includes but is not limited to an RJ-45 interface, an RJ-11 interface, an SC fiber interface, an FDDI interface, an AUI interface, a BNC interface, and a Console interface.

The input/output interface 905 and the communications interface 904 may be local, or may be in the I/O pool 94 in FIG. 1.

It should be noted that the foregoing method embodiments may be implemented by using the processor 901, the memory 902, and the bus 903. However, when the foregoing method embodiments are implemented in different application scenarios, persons skilled in the art should understand that other components such as the communications interface 904 and the input/output interface 905 that are necessary and suitable for implementing the foregoing method embodiments in the application scenarios may further be needed.

Embodiment 9

Embodiment 9 provides a system, which is a system to which the data processing methods provided in Embodiment 4 and Embodiment 5 are applicable. Reference may be made to the detailed descriptions of the system in Embodiment 4 and Embodiment 5, and details are not repeatedly described herein.

A first mapper node herein and the first mapper node provided in the foregoing method embodiments (Embodiment 1, Embodiment 2, Embodiment 3, Embodiment 4, and Embodiment 5) have same functions, and perform actions according to a same principle. A first reducer node herein and the first reducer node provided in the foregoing method embodiments (Embodiment 1, Embodiment 2, Embodiment 3, Embodiment 4, and Embodiment 5) have same functions, and perform actions according to a same principle. For brevity, no specific description is made herein to functions of the first mapper node and the first reducer node in Embodiment 9 and work that can be performed by the first mapper node and the first reducer node. Reference may be directly made to the corresponding action descriptions provided in the method procedures provided in Embodiment 1, Embodiment 2, Embodiment 3, Embodiment 4, and Embodiment 5. Optionally, the first mapper node is implemented by the data processing apparatus in Embodiment 6, and the first reducer node is implemented by the data processing apparatus in Embodiment 7.

The first mapper node is configured to: execute a map task on a data slice, and obtain N groups of at least one data segment according to an execution result of the map task, where N is a positive integer, each of the at least one data segment is to be processed by a corresponding reducer node, the at least one data segment includes a first data segment, the first data segment is a data segment to be processed by the first reducer node, an $M^{th}$ group of at least one data segment includes an $M^{th}$ first data segment, and M is a positive integer less than or equal to N; store all first data segments in the N groups of at least one data segment into the remote storage area, and generate N storage messages, where an $M^{th}$ storage message includes a storage address of the $M^{th}$ first data segment in the remote storage area and a data volume of the $Mt^h$ first data segment; and send the N storage messages to the master node.

The first reducer node is configured to: receive the storage message sent by the master node; obtain the first data segment with a data volume carried in the storage message from the remote storage area according to a storage address carried in the storage message; and execute a reduce task on the first data segment.

In some embodiments, duration for which the first mapper node executes the map task on the data slice includes N first time segments.

That the first mapper node is configured to execute a map task on a data slice, and obtain N groups of at least one data segment according to an execution result of the map task specifically includes: the first mapper node is configured to: when an $M^{th}$ first time segment ends, obtain the $M^{th}$ group of at least one data segment according to an execution result obtained by executing the map task in the $M^{th}$ first time segment.

In some embodiments, that the first mapper node is configured to: store all first data segments in the N groups of at least one data segment into the remote storage area, generate N storage messages, and send the N storage messages to the master node specifically includes:

the first mapper node is configured to: when obtaining the $M^{th}$ group of at least one data segment, store the $M^{th}$ first data segment into the remote storage area, generate the $M^{th}$ storage message, and send the $M^{th}$ storage message to the master node.

In some embodiments, each of the at least one reducer node has a corresponding remote storage area, and a remote storage area corresponding to the first reducer node is used to store a data segment that is to be processed by the first reducer node and that is in data segments obtained by all mapper nodes.

That the first mapper node is configured to store the first data segment into the remote storage area is specifically: the first mapper node is configured to store the first data segment into the remote storage area corresponding to the first reducer node.

That the first reducer node is configured to obtain the first data segment with a data volume carried in the storage message from the remote storage area according to a storage address carried in the storage message is specifically: the first reducer node is configured to: determine, according to the storage address, the remote storage area corresponding to the first reducer node, determine a start address of the first data segment in the remote storage area corresponding to the first reducer node, and read the first data segment with the data volume from the start address.

In some embodiments, each of the at least one mapper node has a corresponding remote storage area, and a remote storage area corresponding to the first mapper node is used to store the at least one data segment obtained by the first mapper node.

That the first mapper node is configured to store the first data segment into the remote storage area is specifically: the first mapper node is configured to store the first data segment into the remote storage area corresponding to the first mapper node.

That the first reducer node is configured to obtain the first data segment with a data volume carried in the storage message from the remote storage area according to a storage address carried in the storage message is specifically: the first reducer node is configured to: determine, according to the storage address, the remote storage area corresponding to the first mapper node, determine a start address of the first data segment in the remote storage area corresponding to the first mapper node, and read the first data segment with the data volume from the start address.

In some embodiments, a quantity of remote storage areas is equal to a product of a quantity of mapper nodes and a quantity of reducer nodes, and each remote storage area is shared by one mapper node and one reducer node.

That the first mapper node is configured to store the first data segment into the remote storage area is specifically: the first mapper node is configured to store the first data segment into the remote storage area shared by the first mapper node and the first reducer node.

that the first reducer node is configured to obtain the first data segment with a data volume carried in the storage message from the remote storage area according to a storage address carried in the storage message is specifically: the first reducer node is configured to: determine, according to the storage address, the remote storage area shared by the first mapper node and the first reducer node, determine a start address of the first data segment in the remote storage area shared by the first mapper node and the first reducer node, and read the first data segment with the data volume from the start address.

In some embodiments, the storage pool is a memory pool.

It should be noted that although terms of "first", "second", "third", and the like may be used in the foregoing embodiment to describe units, storage messages, reducer nodes, and mapper nodes, for example, to describe "a first reducer node", "a second reducer node", and "a third reducer node", which are not limited to the terms. In addition, the terms of "first", "second", "third", and the like are only used for mutual differentiation, and do not indicate a sequence relationship between the terms. For example, "the first reducer node" and "the second reducer node" neither indicate specified reducer nodes, nor indicate a sequence relationship between "the first reducer node" and "the second reducer node", "first" and "second" are used only for comparison to differentiate between input ports, and without departing from the scope of the embodiments of this application, names of "the first reducer node" and "the second reducer node" may be interchanged, or the "the first reducer node" may be changed into a fourth reducer node. Therefore, in this embodiment of this application, the terms of "first", "second", and the like are not limited.

Finally, it should be noted that the foregoing embodiments are merely intended for describing technical solutions provided in this disclosure, but not intended to limiting. Although details are provided with reference to the foregoing embodiments, persons of ordinary skill in the art should understand that they may still make modifications to the foregoing embodiments or make equivalent replacements to some technical features thereof, without departing from the protection scope accorded to this disclosure.

What is claimed is:

1. A data processing method, applied to a system comprising a central processing unit (CPU) pool and a storage pool, wherein the CPU pool is communicatively connected to the storage pool; and the CPU pool comprises at least two CPUs, a master node, at least one mapper node, and at least one reducer node running in the CPU pool, wherein the at least one mapper node comprises a first mapper node, the at least one reducer node comprises a first reducer node, and the first mapper node and the first reducer node run on different CPUs in the CPU pool;

the storage pool comprises a remote storage area shared by the first mapper node and the first reducer node; and the method comprises:

executing, by the first mapper node, a map task on a data slice, and obtaining N groups of at least one data segment according to an execution result of the map task, wherein
- N is a positive integer, each of the at least one data segment is to be processed by a corresponding reducer node, and
- the at least one data segment comprises a first data segment, and an $M^{th}$ group, the first data segment being a data segment to be processed by the first reducer node, and the $M^{th}$ group comprising an $M^{th}$ first data segment, wherein M is a positive integer less than or equal to N;

storing, by the first mapper node, all first data segments in the N groups of at least one data segment into the remote storage area, and generating N storage messages, wherein an $M^{th}$ storage message comprises a storage address of the $M^{th}$ first data segment in the remote storage area and a data volume of the $M^{th}$ first data segment; and sending, by the first mapper node, the N storage messages to the master node.

2. The method according to claim 1, wherein a duration during which the first mapper node executes the map task on the data slice comprises N first time segments; and, wherein
executing, by the first mapper node, the map task on the data slice, and obtaining N groups of at least one data segment according to an execution result of the map task specifically comprises:
when an $M^{th}$ first time segment ends, obtaining, by the first mapper node, the $M^{th}$ group of at least one data segment according to an execution result obtained by executing the map task in the $M^{th}$ first time segment.

3. The method according to claim 2, wherein storing, by the first mapper node, all first data segments in the N groups of the at least one data segment into the remote storage area, generating N storage messages, and sending the N storage messages to the master node specifically comprises:
storing, by the first mapper node when obtaining the $M^{th}$ group of at least one data segment, the $M^{th}$ first data segment into the remote storage area, generating the $M^{th}$ storage message, and sending the AP storage message to the master node.

4. The method according to claim 1, wherein each of the at least one reducer node has a corresponding remote storage area, wherein a remote storage area corresponding to the first reducer node is configured to store a data segment to be processed by the first reducer node, the to-be processed data segments being in data segments obtained by all mapper nodes; and, wherein
storing, by the first mapper node, the first data segment into the remote storage area comprises: storing, by the first mapper node, the first data segment into the remote storage area corresponding to the first reducer node.

5. The method according to claim 1, wherein each of the at least one mapper node has a corresponding remote storage area, and a remote storage area corresponding to the first mapper node is configured to store the at least one data segment obtained by the first mapper node; and, wherein
storing, by the first mapper node, the first data segment into the remote storage area comprises: storing, by the first mapper node, the first data segment into the remote storage area corresponding to the first mapper node.

6. The method according to claim 1, wherein a quantity of remote storage areas is equal to a product of a quantity of mapper nodes and a quantity of reducer nodes, and each remote storage area is shared by one mapper node and one reducer node; and, wherein
storing, by the first mapper node, the first data segment into the remote storage area comprises: storing, by the first mapper node, the first data segment into the remote storage area shared by the first mapper node and the first reducer node.

7. A data processing method, applied to a system comprising a central processing unit (CPU) pool and a storage pool, wherein
the CPU pool is communicatively connected to the storage pool; and the CPU pool comprises at least two CPUs, a master node, at least one mapper node, and at least one reducer node running in the CPU pool, wherein the at least one mapper node comprises a first mapper node, the at least one reducer node comprises a first reducer node, and the first mapper node and the first reducer node run on different CPUs in the CPU pool;

the storage pool comprises a remote storage area shared by the first mapper node and the first reducer node; and the method comprises:

receiving, by the first reducer node, a storage message sent by the master node, wherein the storage message includes a storage address of a first data segment in the remote storage area and a data volume of the first data segment, the first data segment being to be processed by the first reducer node and being in at least one data segment obtained by the first mapper node;

obtaining, by the first reducer node, the first data segment with the data volume from the remote storage area according to the storage address carried in the storage message; and executing, by the first reducer node, a reduce task on the first data segment.

8. The method according to claim 7, wherein each of the at least one reducer node has a corresponding remote storage area, wherein a remote storage area corresponding to the first reducer node is configured to store a data segment to be processed by the first reducer node, the to-be processed data segment being in data segments obtained by all mapper nodes; and, wherein
obtaining, by the first reducer node, the first data segment with the data volume from the remote storage area according to the storage address comprises:
determining, by the first reducer node according to the storage address, the remote storage area corresponding to the first reducer node, determining a start address of the first data segment in the remote storage area corresponding to the first reducer node, and reading the first data segment with the data volume from the start address.

9. The method according to claim 7, wherein each of the at least one mapper node has a corresponding remote storage area, and a remote storage area corresponding to the first mapper node is configured to store the at least one data segment obtained by the first mapper node according to an execution result obtained after the mapper node executes a map task; and wherein obtaining, by the first reducer node, the first data segment with the data volume from the remote storage area according to the storage address comprises:

determining, by the first reducer node according to the storage address, the remote storage area corresponding to the first mapper node, determining a start address of the first data segment in the remote storage area corresponding to the first mapper node, and reading the first data segment with the data volume from the start address.

10. The method according to claim 7, wherein a quantity of remote storage areas is equal to a product of a quantity of mapper nodes and a quantity of reducer nodes, and each remote storage area is shared by one mapper node and one reducer node; and wherein obtaining, by the first reducer node, the first data segment with the data volume from the remote storage area according to the storage address comprises:

determining, by the first reducer node according to the storage address, the remote storage area shared by the first mapper node and the first reducer node, determining a start address of the first data segment in the remote storage area shared by the first mapper node and the first reducer node, and reading the first data segment with the data volume from the start address.

11. A computer device, comprising at least one central processing unit (CPU), wherein the at least one CPU in the computer device is in a CPU pool, the CPU pool being communicatively connected to a storage pool; and the CPU pool running a master node, at least one mapper node, and at least one reducer node, wherein the at least one mapper node comprises a first mapper node, and the at least one reducer node comprises a first reducer node, wherein the first mapper node and the first reducer node run on different CPUs in the CPU pool, and the first mapper node runs on one or more CPUs in the computer device; and the first mapper node and the first reducer node share a remote storage area comprised in the storage pool; and wherein the computer device comprises at least one memory having a plurality of instructions stored thereon, when the instructions are executed by the one or more CPUs in the computer device to realize the first mapper node, the instructions cause the one or more CPUs to:

execute a map task on a data slice, and obtain N groups of at least one data segment according to an execution result of the map task, wherein N is a positive integer, each of the at least one data segment is to be processed by a corresponding reducer node, and the at least one data segment comprises a first data segment, and an $M^{th}$ group, the first data segment being a data segment to be processed by the first reducer node, and the $M^{th}$ group comprising an $M^{th}$ first data segment, wherein M is a positive integer less than or equal to N; and store all first data segments in the N groups of at least one data segment into the remote storage area, generate N storage messages, and send the N storage messages to the master node, wherein an $M^{th}$ storage message comprises a storage address of the $M^{th}$ first data segment in the remote storage area and a data volume of the AP first data segment.

12. The computer device according to claim 11, wherein a duration during which the first mapper node executes the map task on the data slice comprises N first time segments; and, wherein executing, by the first mapper node, the map task on the data slice, and obtaining N groups of at least one data segment according to an execution result of the map task specifically comprises:

when an $M^{th}$ first time segment ends, obtaining, by the first mapper node, the $Mt^h$ group of at least one data segment according to an execution result obtained by executing the map task in the $M^{th}$ first time segment.

13. The computer device according to claim 11, wherein the instructions cause the one or more CPUs to:

when obtaining the $M^{th}$ group of at least one data segment, store the $M^{th}$ first data segment into the remote storage area, generate the $M^{th}$ storage message, and send the $M^{th}$ storage message to the master node.

14. The computer device according to claim 11, wherein each of the at least one reducer node has a corresponding remote storage area, wherein a remote storage area corresponding to the first reducer node is configured to store a data segment to be processed by the first reducer node, the to-be processed data segments being in data segments obtained by all mapper nodes; and wherein the instructions cause the one or more CPUs to store the first data segment into the remote storage area corresponding to the first reducer node.

15. The computer device according to claim 11, wherein each of the at least one mapper node has a corresponding remote storage area, wherein a remote storage area corresponding to the first mapper node is configured to store the at least one data segment obtained by the first mapper node; and wherein the instructions cause the one or more CPUs to store the first data segment into the remote storage area corresponding to the first mapper node.

16. The computer device according to claim 11, wherein a quantity of remote storage areas is equal to a product of a quantity of mapper nodes and a quantity of reducer nodes, and each remote storage area is shared by one mapper node and one reducer node; and wherein the instructions cause the one or more CPUs to store the first data segment into the remote storage area shared by the first mapper node and the first reducer node.

17. A computer device, comprising at least one central processing unit (CPU), wherein the at least one CPU in the computer device is in a CPU pool, wherein the CPU pool is communicatively connected to a storage pool; and the CPU pool runs a master node, at least one mapper node, and at least one reducer node, wherein the at least one mapper node comprises a first mapper node, the at least one reducer node comprises a first reducer node, wherein the first mapper node and the first reducer node run on different CPUs in the CPU pool, and the first reducer node runs on one or more CPUs in the computer device; and the first mapper node and the first reducer node share a remote storage area comprised in the storage pool; and wherein the computer device comprises at least one memory having a plurality of instructions stored thereon, when the instructions are executed by the one or more CPUs in the computer device to realize the first reducer node, the instructions cause the one or more CPUs to:

receive a storage message sent by the master node, wherein the storage message includes a storage address of a first data segment in the remote storage area and a data volume of the first data segment, wherein the first data segment is to be processed by the first reducer node, the first data segment being in the at least one data segment obtained by the first mapper node;

obtain the first data segment with the data volume from the remote storage area according to the storage address carried in the storage message; and execute a reduce task on the first data segment.

18. The computer device according to claim 17, wherein each of the at least one reducer node has a corresponding remote storage area, wherein a remote storage area corresponding to the first reducer node is configured to store a data segment to be processed by the first reducer node, the to-be processed data segment being in data segments obtained by all mapper nodes; and wherein the instructions cause the one or more CPUs to determine, according to the storage address, the remote storage area corresponding to the first reducer node, determine a start address of the first data segment in the remote storage area corresponding to the first reducer node, and read the first data segment with the data volume from the start address.

19. The computer device according to claim 17, wherein each of the at least one mapper node has a corresponding remote storage area, wherein a remote storage area corresponding to the first mapper node is configured to store the at least one data segment obtained by the first mapper node according to an execution result obtained after the mapper node executes a map task; and wherein the instructions cause the one or more CPUs to determine, according to the storage address, the remote storage area corresponding to the first mapper node, determine a start address of the first data segment in the remote storage area corresponding to the first mapper node, and read the first data segment with the data volume from the start address.

20. The computer device according to claim 17, wherein a quantity of remote storage areas is equal to a product of a quantity of mapper nodes and a quantity of reducer nodes, and each remote storage area is shared by one mapper node and one reducer node; and wherein the instructions instruct the one or more CPUs to determine, according to the storage address, the remote storage area shared by the first mapper node and the first reducer node, determine a start address of the first data segment in the remote storage area shared by the first mapper node and the first reducer node, and read the first data segment with the data volume from the start address.

* * * * *